United States Patent
Okita et al.

(10) Patent No.: US 6,434,457 B2
(45) Date of Patent: Aug. 13, 2002

(54) APPARATUS FOR DETECTING ABNORMALITY OF A VEHICLE SENSOR AND METHOD

(75) Inventors: Toshinori Okita, Susono; Akira Tanaka, Anjyo; Yoshiyuki Yasui, Kariya; Mamoru Sawada, Yokkaichi; Noboru Sugiura, Aichi-gun, all of (JP)

(73) Assignees: Toyota Jidosha Kabushiki Kaisha, Toyota; Aisin Seiki Kabushiki Kaisha; Denso Corporation, both of Kariya, all of (JP)

( * ) Notice: Subject to any disclaimer, the term of this patent is extended or adjusted under 35 U.S.C. 154(b) by 0 days.

(21) Appl. No.: 09/808,159

(22) Filed: Mar. 15, 2001

(30) Foreign Application Priority Data

Mar. 21, 2000 (JP) .......................... 2000-078766

(51) Int. Cl.⁷ .............................................. G06F 17/00
(52) U.S. Cl. .............................. 701/34; 701/92; 701/70; 701/76; 701/82
(58) Field of Search ............................... 701/34, 35, 92, 701/81, 82, 70, 72, 73, 76; 180/197, 199

(56) References Cited

U.S. PATENT DOCUMENTS 6,202,009 B1 * 3/2001 Tseng .......................... 701/34
6,223,116 B1 * 4/2001 Kin et al. ..................... 701/82
6,276,188 B1 * 8/2001 Horiuchi ..................... 73/1.37

FOREIGN PATENT DOCUMENTS

| EP | 0 645 288 A2 | 9/1994 |
| EP | 0 891 904 A2 | 1/1999 |
| JP | A 6-206569 | 7/1994 |
| JP | 08-324414 | 12/1996 |

* cited by examiner

*Primary Examiner*—William A. Cuchlinski, Jr.
*Assistant Examiner*—Marthe Y. Marc-Coleman
(74) *Attorney, Agent, or Firm*—Oliff & Berridge, PLC

(57) ABSTRACT

An apparatus for detecting abnormality of a vehicle sensor and a method are provided. The apparatus is capable of preventing erroneous detection of abnormalities of sensors. The apparatus has a grip degree detecting device for detecting grip degree of a wheel of the vehicle with respect to a road surface. In a case in which the grip degree is lower than a predetermined degree, detection for presence of an abnormality of a yaw rate sensor, a cross acceleration sensor and a steering angle sensor are prohibited.

18 Claims, 16 Drawing Sheets

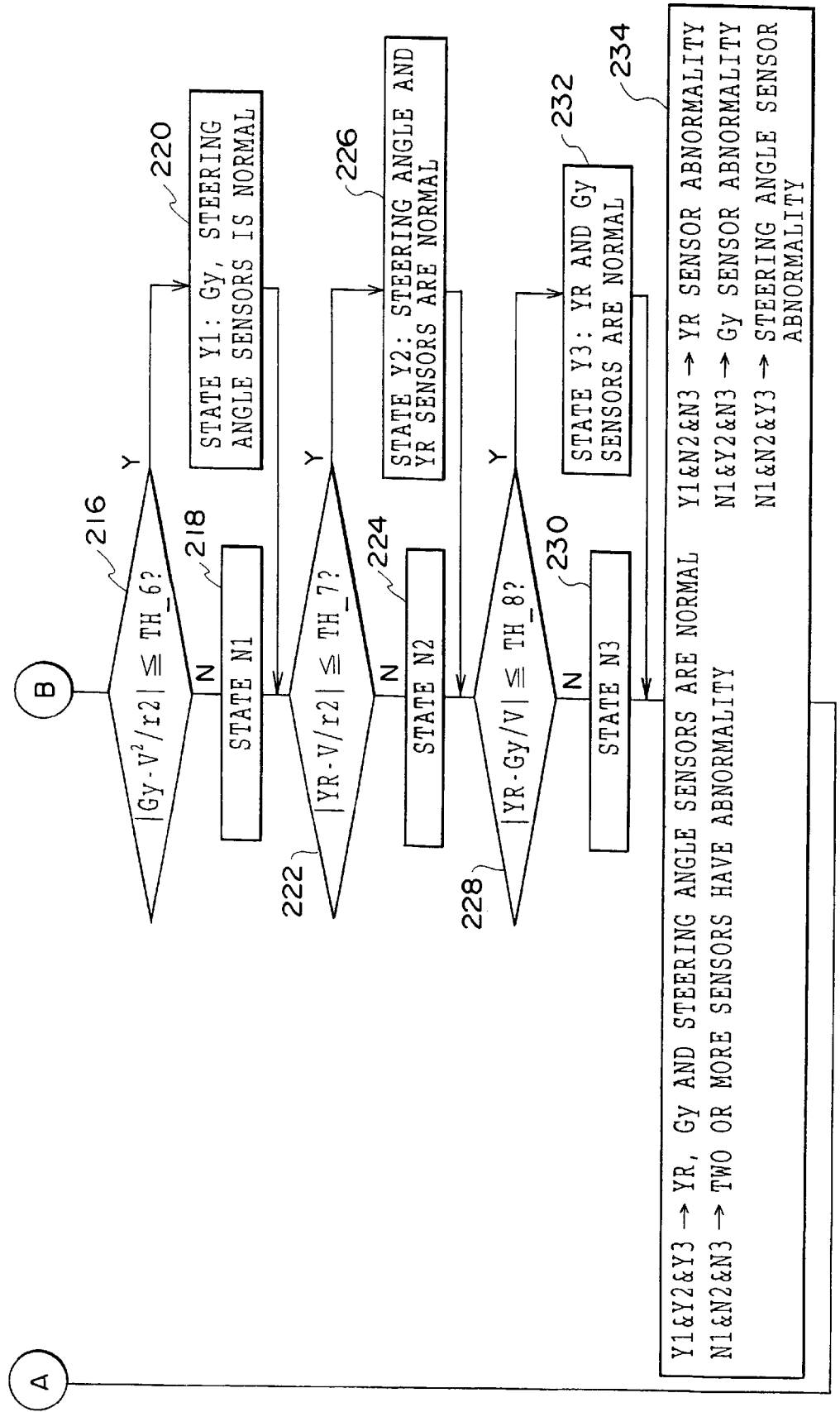

APPARATUS FOR DETECTING ABNORMALITY OF A VEHICLE SENSOR AND METHOD

BACKGROUND OF THE INVENTION

1. Field of the Invention

The present invention relates to an apparatus for detecting abnormality of a vehicle sensor and a method, and particularly to an apparatus for detecting abnormality of a vehicle sensor and a method that detects for presence or absence of an abnormality of a sensor mounted to a vehicle.

2. Description of the Related Art

In order to restrain cross-slipping of a vehicle that is caused when a driver carries out an abrupt steering wheel operation for avoiding an obstacle or when a vehicle reaches a curve of a slippery road, a VSC (Vehicle Stability Control) system is known as a technology for ensuring stability of the vehicle by automatically controlling engine output and brake force at respective wheels. With this system, the stability of the vehicle is achieved by controlling the engine output and the brake force at the respective wheels by detecting cross-slipping of the vehicle with various sensors such as a yaw rate sensor, a steering angle sensor and a cross acceleration sensor. Therefore, when abnormalities are caused in the various sensors, detection accuracy of cross-slipping of the vehicle deteriorates and the vehicle may not be stabilized sufficiently.

Hence, it is necessary to detect presence or absence of abnormalities of the various sensors and, as a technology applicable thereto, there is provided a technology described in Japanese Patent Laid-Open No. 6-206569.

According to this technology, by calculating an estimated yaw rate on the basis of speeds of left and right wheels and comparing a result of this calculation with an output value of a yaw rate sensor, an abnormality of the yaw rate sensor can be detected. In this way, according to the technology described in Japanese Patent Laid-Open No. 6-206569, abnormality of the sensor is detected by comparing the sensor output with a value calculated (estimated) from a vehicle state utilizing steady state equations.

However, with the technology described in Japanese Patent Laid-Open No. 6-206569, when the vehicle does not grip the road, the steady state equations used in the calculation are not established and, therefore, there is a problem in that abnormalities of sensors may be detected erroneously.

SUMMARY OF THE INVENTION

The present invention has been created in order to resolve the above-described problem and an object of the present invention is to provide an apparatus for detecting abnormality of a vehicle sensor which apparatus is capable of preventing erroneous detection of abnormalities of sensors, and a method.

In order to achieve the above-described object, in a first aspect of the present invention, there is provided an apparatus for detecting abnormality of a vehicle sensor comprising: a first sensor for detecting an operational state of a vehicle; a second sensor, which is different from the first sensor, for detecting the operational state of the vehicle; an abnormality detecting device for detecting for presence of an abnormality of the first sensor on the basis of a predefined operational state of the vehicle detected by the first sensor and the predefined operational state of the vehicle estimated on the basis of an output of the second sensor; a grip degree detecting device for detecting grip degree of a wheel of the vehicle with respect to a road surface; and a prohibiting device for prohibiting detection for presence of an abnormality of the first sensor by the abnormality detecting device in at least one case of a case in which the grip degree is lower than a predetermined degree and a case in which a cross-gradient of the road surface is equal to or more than a predetermined value.

According to the apparatus of detecting abnormality of vehicular sensor of the present invention, presence or absence of an abnormality of the first sensor is detected by the abnormality detecting device on the basis of a predefined movement state of the vehicle detected by the first sensor, which is for detecting the operational state of the vehicle, and a predefined movement state of the vehicle estimated on the basis of the output of the second sensor, which is different from the first sensor.

Further, detection of presence or absence of an abnormality of the first sensor can be carried out by the abnormality detecting device, by assuming that the first sensor is abnormal when a difference between the predefined operational state of the vehicle detected by the first sensor and the predefined operational state of the vehicle estimated on the basis of the output of the second sensor is larger than a previously determined threshold value, assuming that the first sensor is abnormal when a ratio of the predefined operational state of the vehicle detected by the first sensor to the predefined operational state of the vehicle estimated on the basis of output of the second sensor is larger than a previously determined ratio, or the like.

Moreover, all sensors mounted to the vehicle can be included in the first sensor and the second sensor of the present invention.

Furthermore, in the present invention, the grip degree of the wheel with respect to the road is detected by the grip degree detecting device, and detection of presence or absence of an abnormality of the first sensor by the abnormality detecting device is prohibited by the prohibiting device in at least one case of the case in which the grip degree is lower than the predetermined degree and the case in which the cross gradient of the road is equal to or larger than the predetermined value.

That is, in at least one of the case in which the grip degree of the wheel with respect to the road is low and the case in which the cross gradient of the road is large, steady state equations are not established, and the predefined operational state of the vehicle estimated on the basis of the second sensor has low reliability. Therefore, in this case, the detection of presence or absence of an abnormality is not carried out.

In this way, according to the apparatus for detecting abnormality of a vehicle sensor of the present invention, in at least one case of the case in which the grip degree of the wheel with respect to the road is lower than the predetermined degree and the case in which the cross gradient of the road is equal to or larger than the predetermined value, abnormality detection for sensors constituting an object of abnormality detection is prohibited. Thus, erroneous detection of abnormalities of sensors can be preemptively prevented.

In this case, the first sensor in the apparatus for detecting abnormality of a vehicle sensor according to the present invention can be at least one of a cross acceleration sensor, a yaw rate sensor and a steering angle sensor. As described above, according to a VSC system, cross-slipping of the vehicle is detected by the cross acceleration sensor, the yaw rate sensor and the steering angle sensor. Therefore, by having as the first sensor, which is the subject of abnormality detection in the present invention, at least one of the cross acceleration sensor, the yaw rate sensor and the steering angle sensor, control by the VSC system can be made highly accurate in the case of applying the present invention in the VSC system.

Further, a wheel speed sensor may be applied as the second sensor of the present invention.

Furthermore, in a second aspect of the present invention, there is provided an apparatus for detecting abnormality of a vehicle sensor according to the first aspect, wherein a yaw rate sensor and a cross-acceleration sensor serve as the first sensor, and the abnormality detecting device detects for presence of an abnormality of the yaw rate sensor on the basis of a yaw rate detected by the yaw rate sensor and a yaw rate estimated on the basis of the output of the second sensor; in a case where an abnormality of the yaw rate sensor is not detected, the cross-acceleration sensor serves as the first sensor, the yaw rate sensor serves as the second sensor, and the abnormality detecting device detects for presence of an abnormality of the cross-acceleration sensor on the basis of a cross-acceleration detected by the cross-acceleration sensor and a cross-acceleration estimated on the basis of an output of the yaw rate sensor; and in a case where an abnormality of the yaw rate sensor is detected, the cross-acceleration sensor serves as the first sensor, a sensor other than the yaw rate sensor serves as the second sensor, and the abnormality detecting device detects for presence of an abnormality of the cross-acceleration sensor on the basis of the cross-acceleration detected by the cross-acceleration sensor and a cross-acceleration estimated on the basis of an output of the sensor other than the yaw rate sensor.

In this case, when the yaw rate sensor is abnormal, the cross acceleration is estimated without using the output of the yaw rate sensor. Accordingly, erroneous detection of an abnormality of the cross acceleration sensor can be prevented.

Furthermore, in a third aspect of the present invention, there is provided an apparatus for detecting abnormality of a vehicle sensor according to the first aspect, wherein: a yaw rate sensor and a cross-acceleration sensor serve as the first sensor, a wheel speed sensor serves as the second sensor, the abnormality detecting device detects for presence of an abnormality of the yaw rate sensor on the basis of a yaw rate detected by the yaw rate sensor and a yaw rate estimated on the basis of an output of the wheel speed sensor; the abnormality detecting device detects for presence of an abnormality of the cross-acceleration sensor on the basis of a cross-acceleration detected by the cross-acceleration sensor and a cross-acceleration estimated on the basis of the output of the wheel speed sensor; in a case where the yaw rate sensor and the cross-acceleration sensor are normal, the abnormality detecting device detects for presence of an abnormality of the steering angle sensor on the basis of the yaw rate detected by the yaw rate sensor and a yaw rate estimated on the basis of the cross-acceleration detected by the cross-acceleration sensor, the output of the wheel speed sensor, and an output of the steering angle sensor.

Furthermore, in a fourth aspect of the present invention, there is provided an apparatus for detecting abnormality of a vehicle sensor according to the third aspect, wherein: in a case where the abnormality detecting device detects presence of an abnormality of the cross-acceleration sensor on the basis of the cross-acceleration detected by the cross-acceleration sensor and the cross-acceleration estimated on the basis of the output of the wheel speed sensor, on the basis of the cross-acceleration detected by the cross-acceleration sensor and a cross-acceleration estimated on the basis of an output of a predetermined measuring device, which of: an abnormality of the cross-acceleration sensor itself, or a cause other than the abnormality of the cross-acceleration sensor itself, is a cause of detection of the abnormality of the cross-acceleration sensor, is determined.

Furthermore, in a fifth aspect of the present invention, there is provided an apparatus for detecting abnormality of vehicle sensor according to the fourth aspect, wherein the predetermined measuring device is a slip angle measuring device for measuring a vehicle body slip angle, and the abnormality detecting device determines, on the basis of the cross-acceleration detected by the cross-acceleration sensor and a cross-acceleration estimated on the basis of an output of the slip angle measuring device, whether the detection of the abnormality of the cross-acceleration sensor is due to the abnormality of the cross-acceleration sensor itself, or the detection of the abnormality of the cross-acceleration sensor is rather than due to the abnormality of the cross-acceleration sensor itself, due to the cross-gradient being larger than a predetermined value.

Furthermore, in a sixth aspect of the present invention, there is provided an apparatus for detecting abnormality of vehicle sensor according to the first aspect, further comprising: a cross-gradient detecting device for detecting the cross-gradient of the road surface, wherein before the abnormality detecting device detecting for presence of an abnormality of the first sensor, the grip degree and the cross-gradient of the road surface is detected.

Furthermore, in a seventh aspect of the present invention, there is provided a method for detecting abnormality of a vehicle sensor comprising: detecting an operational state of a vehicle by a first sensor; detecting the operational state of the vehicle by a second sensor, which is different from the first sensor; detecting presence of an abnormality of the first sensor on the basis of a predefined operational state of the vehicle detected by the first sensor and the predefined operational state of the vehicle estimated on the basis of an output of the second sensor; detecting grip degree of a wheel of the vehicle with respect to a road surface; and prohibiting detection for presence of an abnormality of the first sensor in at least one case of a case in which the grip degree is lower than a predetermined degree and a case in which a cross-gradient of the road surface is equal to or more than a predetermined value.

Furthermore, in a eighth aspect of the present invention, there is provided an apparatus for detecting abnormality of a vehicle sensor comprising: a first sensor for detecting an operational state of a vehicle; a second sensor, which is different from the first sensor, for detecting the operational state of the vehicle; an abnormality detecting device for detecting for presence of an abnormality of the first sensor on the basis of a predefined operational state of the vehicle detected by the first sensor and the predefined operational state of the vehicle estimated on the basis of an output of the second sensor; a grip degree detecting device for detecting grip degree of a wheel of the vehicle with respect to a road surface; and a prohibiting device for prohibiting detection for presence of an abnormality of the first sensor by the abnormality detecting device in at least one case of a case in which the grip degree is lower than a predetermined degree and a case in which a cross-gradient of the road surface is equal to or more than a predetermined value, wherein the first sensor is at least one of a cross-acceleration sensor, a yaw rate sensor and a steering angle sensor, and the second sensor is a wheel speed sensor.

Furthermore, in a ninth aspect of the present invention, there is provided a method for detecting abnormality of a vehicle sensor comprising: detecting an operational state of a vehicle by a first sensor; detecting the operational state of the vehicle by a second sensor, which is different from the first sensor; detecting presence of an abnormality of the first sensor on the basis of a predefined operational state of the vehicle detected by the first sensor and the predefined operational state of the vehicle estimated on the basis of an output of the second sensor; detecting grip degree of a wheel of the vehicle with respect to a road surface; and prohibiting detection for presence of an abnormality of the first sensor in at least one case of a case in which the grip degree is lower than a predetermined degree and a case in which a cross-gradient of the road surface is equal to or more than a predetermined value.

Furthermore, in a tenth aspect of the present invention, there is provided an apparatus for detecting abnormality of a vehicle sensor comprising: a first sensor for detecting an operational state of a vehicle; a second sensor, which is different from the first sensor, for detecting the operational state of the vehicle; an abnormality detecting device for detecting for presence of an abnormality of the first sensor on the basis of a predefined operational state of the vehicle detected by the first sensor and the predefined operational state of the vehicle estimated on the basis of an output of the second sensor; a grip degree detecting device for detecting grip degree of a wheel of the vehicle with respect to a road surface; and a prohibiting device for prohibiting detection for presence of an abnormality of the first sensor by the abnormality detecting device in at least one case of a case in which the grip degree is lower than a predetermined degree and a case in which a cross-gradient of the road surface is equal to or more than a predetermined value, wherein the first sensor is at least one of a cross-acceleration sensor, a yaw rate sensor and a steering angle sensor, and the second sensor is a wheel speed sensor.

BRIEF DESCRIPTION OF THE DRAWINGS

FIGS. 13A and 13B are a flowchart showing flow of processing of a sensor abnormality detecting circuit according to a second embodiment.

DETAILED DESCRIPTION OF THE PREFERRED EMBODIMENTS

Following, a detailed explanation will be given of embodiments of an apparatus for detecting abnormality of a vehicle sensor according to the present invention, with reference to the drawings.

First Embodiment

Figure 1:
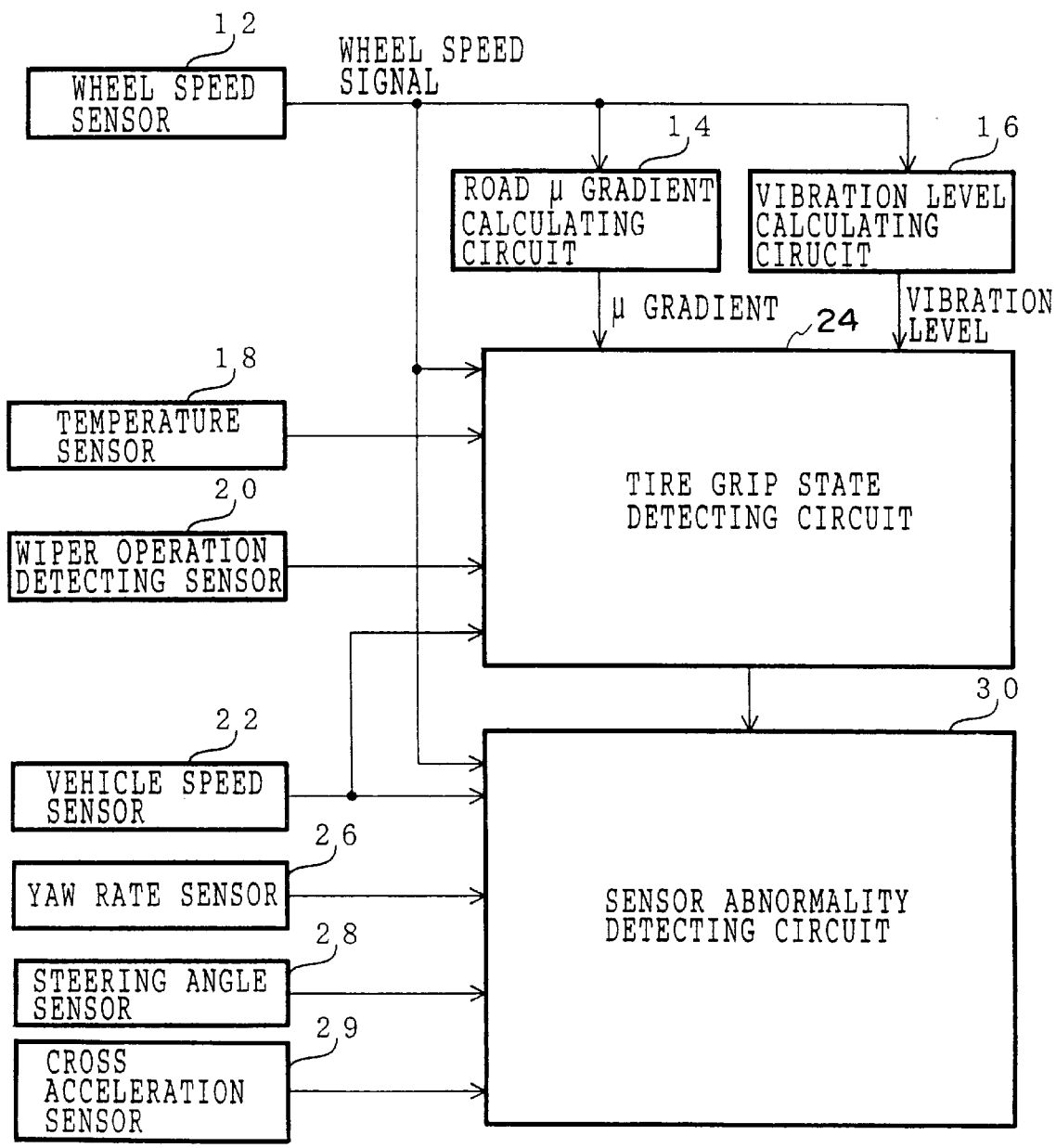
FIG. 1 is a block diagram of an apparatus for detecting abnormality of a vehicle sensor according to an embodiment of the present invention.

First, an explanation will be given of structure of an apparatus for detecting abnormality of a vehicle sensor according to the present embodiment with reference to FIG. 1.

As shown in the drawing, the apparatus for detecting abnormality of a vehicle sensor according to the present embodiment, is provided with a road $\mu$ gradient calculating circuit 14 for calculating, on the basis of wheel speeds detected by a wheel speed sensor 12, a gradient of $\mu$ of a road (hereinafter, referred to as "$\mu$ gradient"), which is a gradient of the friction coefficient $\mu$ between a wheel and the road with respect to slip speed and a vibration level calculating circuit 16 for calculating, on the basis of wheel speeds detected by the wheel speed sensor 12, a vibration level, which is a physical amount representing a magnitude of vibration of the wheel.

Further, the apparatus for detecting abnormality of a vehicle sensor according to the present embodiment is provided with a tire grip state detecting circuit 24, which serves as a grip degree detecting means for detecting a grip state of the wheel with respect to the road and outputting the grip state as a grip level, on the basis of an environmental temperature detected by a temperature sensor 18, an operational state of a wiper detected by a wiper operation detecting sensor 20, a vehicle speed detected by a vehicle speed sensor 22, the $\mu$ gradient calculated by the road $\mu$ gradient calculating circuit 14 and the vibration level calculated by the vibration level calculating circuit 16.

Further, the apparatus for detecting abnormality of a vehicle sensor according to the present embodiment is provided with a sensor abnormality detecting circuit 30 for detecting presence or absence of respective abnormalities of a yaw rate sensor 26, a steering angle sensor 28 and a cross acceleration sensor 29 in cases where the grip level detected by the tire grip state detecting circuit 24 is high.

Here, the wheel speed sensor 12 can be constituted by so-called wheel speed sensors, which output a sensor output signal in accordance with a wheel speed for each wheel, and a calculating means for calculating from the sensor output signals actual rotational speeds represented by the wheel speed signals.

Figure 2:
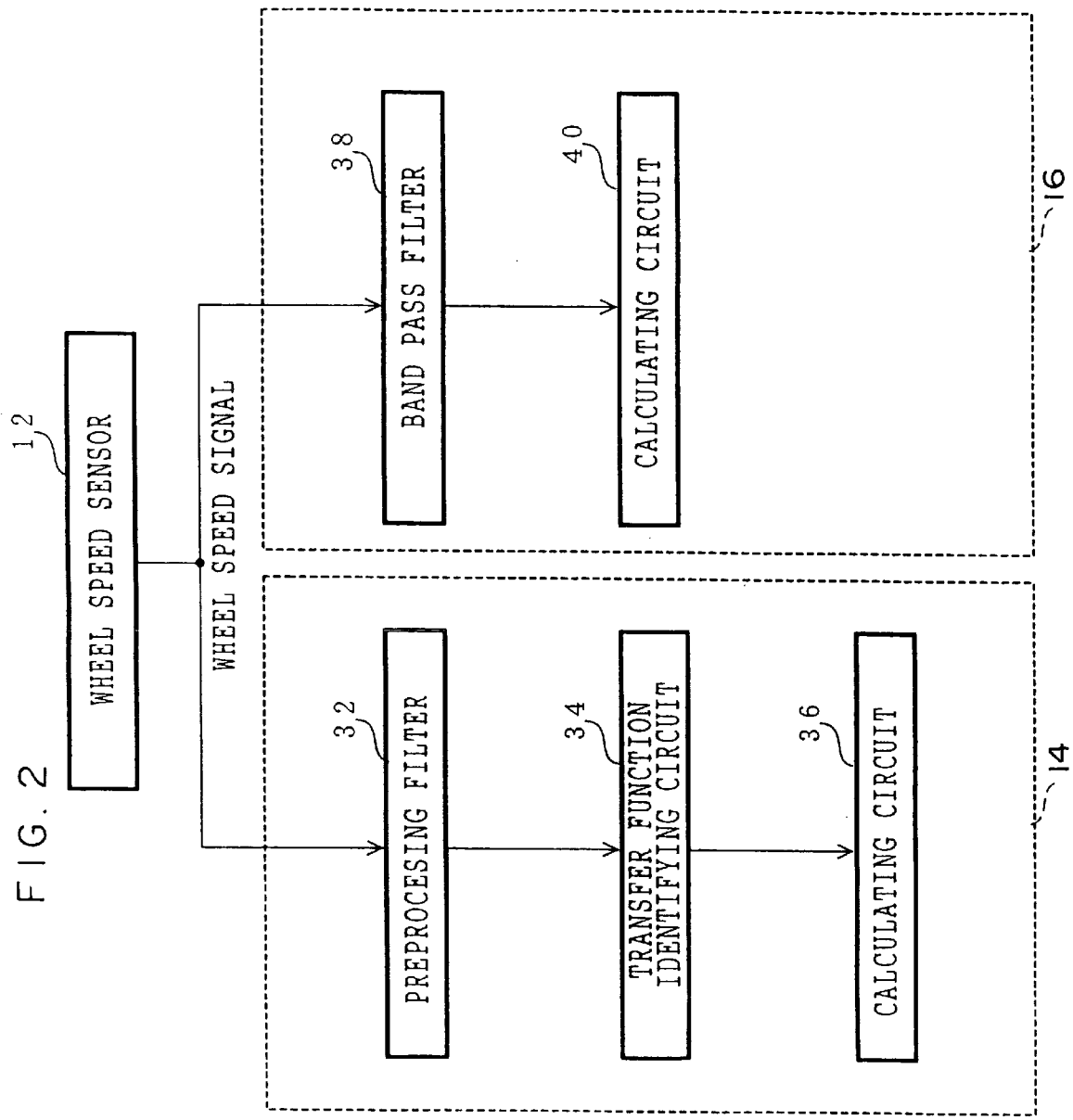
FIG. 2 is a block diagram of a road $\mu$ gradient calculating circuit and a vibration level calculating circuit.

Next, a detailed explanation will be given of the road $\mu$ gradient calculating circuit 14 and the vibration level calculating circuit 16 with reference to FIG. 2.

The road $\mu$ gradient calculating circuit 14 is provided with a preprocessing filter 32 for detecting, from the wheel speed signal detected for each wheel by the wheel speed sensor 12, wheel speed vibration of each wheel, in the form of a response output of a wheel resonance system subjected to road irregularities. The road $\mu$ gradient calculating circuit 14 is also provided with a transfer function identifying circuit 34 for identifying a transfer function for each wheel that satisfies the detected wheel speed oscillation, using a least squares method, and a calculating circuit 36 for calculating $\mu$ gradient for each wheel on the basis of the identified transfer function.

The preprocessing filter 32 can be structured by a band pass filter that passes only frequency components within a constant band centering on a frequency expected to be a resonance frequency of the wheel resonance system, or a high pass filter that passes only frequency components in a high band that includes the expected resonance frequency component. Further, in the present embodiment, parameters for prescribing the frequency characteristic of the band pass filter or high pass filter are fixed at constant values.

Further, a direct current component is removed from output of the preprocessing filter 32. That is, only the wheel speed vibration around the wheel speed signal is extracted.

Here, a transfer function F(s) of the preprocessing filter 32 is represented by the following equation.

$$F(s) = \frac{1}{\sum_{i=0}^{m} c_i s^{m-1}} \qquad \text{Equation (1)}$$

where $c_i$ represents a coefficient of a filter transfer function and s represents a Laplacian operator.

Next, an operational equation which the transfer function identifying circuit 34 uses will be derived. Further, in the present embodiment, calculation by the preprocessing filter 32 is implemented so as to include calculation assigned to the transfer function identifying circuit 34.

First, the transfer function to be identified is constituted by a second order model with road disturbance $\Delta T_d$ as a vibrating input, and with wheel speed vibrations $\Delta\omega 1$ detected by the preprocessing filter 32 as a response output. That is, a vibration model is assumed as follows.

$$\Delta\omega_1 = \frac{b_2}{\sum_{i=0}^{2} c_i s^{2-i}} \Delta T + v_1 a_0 = 1 \qquad \text{Equation (2)}$$

where v represents observation noise included in observing the wheel speed signal. The following equation is provided by modifying Equation (2).

$$\sum_{i=0}^{2} a_1 s^{2-i} \Delta\omega_1 = b_2 \Delta T_d + \sum_{i=0}^{2} a_1 s^{2-i} v \qquad \text{Equation (3)}$$

First, an equation provided by multiplying Equation (3) by the preprocessing filter of Equation (1), is digitized. At this time, $\Delta\omega 1$, $\Delta Td$ and v can be represented as digitized data $\Delta\omega 1(k)$, $\Delta Td(k)$ and v(k) (k represents a sampling number: k=1, 2, 3, . . . ) sampled at intervals of sampling period Ts. The Laplacian operator s can be digitized by a predetermined digitizing method. In the present embodiment, the Laplacian operator s is digitized by a first order bi-primary transformation. d represents a one sample delay operator.

$$s = \frac{2}{T_s} \frac{1 - d^{-1}}{1 + d^{-1}} \qquad \text{Equation}$$

Further, an order number m of the preprocessing filter is preferably 2 or more. Thus, in this embodiment, and also in consideration of a calculation time period, m=2. Hence, the following equations are provided.

$$\sum_{i=0}^{2} a_i \xi_{vi}(k) = b_2 \xi_{u2}(k) + \sum_{i=0}^{2} a_i \xi_{vi}(k) \qquad \text{Equation (4)}$$

$$\xi_{v1}(k) = \left(\frac{T_s}{2}\right)^i (1+d)^i (1-d)^{2-i} F_0(d) \Delta\omega(k) \qquad \text{Equation (5)}$$

$$\xi_{v2}(k) = \left(\frac{T_s}{2}\right)^2 (1+d)^2 F_0(d) \Delta T_d(k) \qquad \text{Equation (6)}$$

$$\xi_{vi}(k) = \left(\frac{T_s}{2}\right)^i (1+d)^i (1-d)^{2-i} F_0(d) v(k) \qquad \text{Equation (7)}$$

$$F_0(d) = \frac{1}{\sum_{i=0}^{2} c_i \left(\frac{T_s}{2}\right)^i (1+d)^i (1-d)^{2-i}} \qquad \text{Equation (8)}$$

Further, in order to identify the transfer function from respective the wheel speed vibration $\Delta\omega 1$ data using the least squares method, Equation (4) is modified as follows to take the form of a primary function with regard to the parameter to be identified. "T" represents transposition of a matrix.

$$\xi_{v0}(k) = \zeta^T(k)\theta + r(k) \qquad \text{Equation (9)}$$

Here, $$\zeta(k) = [-\xi_{v1}(k) - \xi_{v2}(k)]^T \qquad \text{Equation (10)}$$
$$\theta = [a_1 a_2]^T$$

$$r(k) = b_2 \xi_{v2}(k) + \sum_{i=0}^{2} a_i \xi vi(k)$$

In the above equation, $\theta$ represents the transfer function parameter to be identified.

Next, the vibration level calculating circuit 16 is provided with a band pass filter 38 which extracts wheel speed signals in a predetermined range, which includes frequencies including at least one oscillation point or at least one anti-resonance point and which is larger than a low frequency region, from the wheel speed signals detected by the wheel speed sensors 12. The band pass filter 38 is connected with a calculating circuit 40 for calculating, on the basis of the wheel speeds signal extracted by the band pass filter 38, a physical amount representing a magnitude of wheel vibrations and, in the present embodiment, a vibration level.

Figure 3:
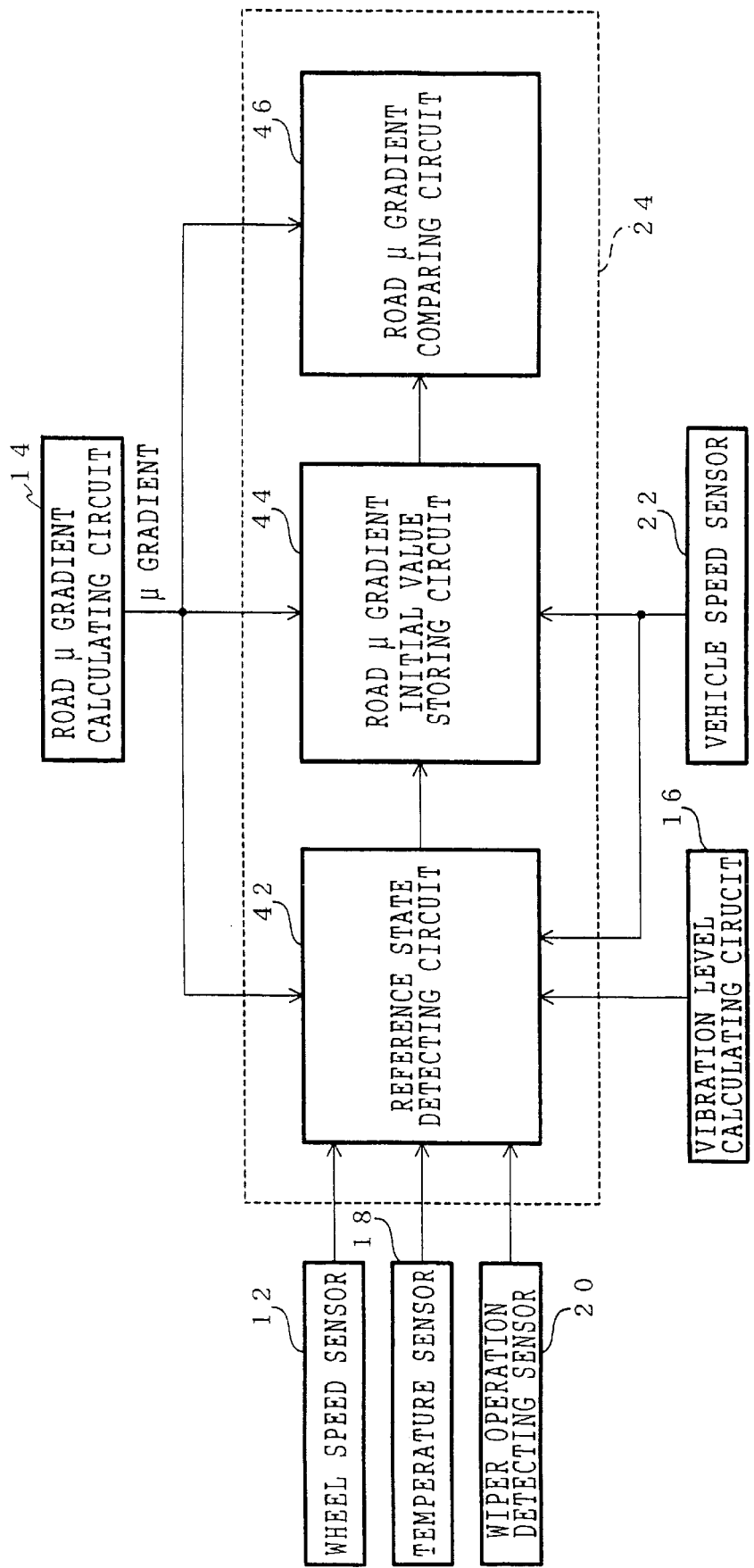
FIG. 3 is a block diagram of a tire grip state detecting circuit.

Next, an explanation will be given of the tire grip state detecting circuit 24. As shown in FIG. 3, the tire grip state detecting circuit 24 is provided with a reference state detecting circuit 42 for detecting a reference state, which is a state in which the grip state of the wheel with respect to the road is high, a road $\mu$ gradient initial value storing circuit 44 for storing a $\mu$ gradient initial value, which is an average value of $\mu$ gradient in the reference state detected by the reference state detecting circuit 42, and a road $\mu$ gradient comparing circuit 46 for comparing the $\mu$ gradient initial value stored to the road $\mu$ gradient initial value storing circuit 44 with a detected μ gradient value and outputting a value (grip level) that represents a tire grip state.

Figure 4:
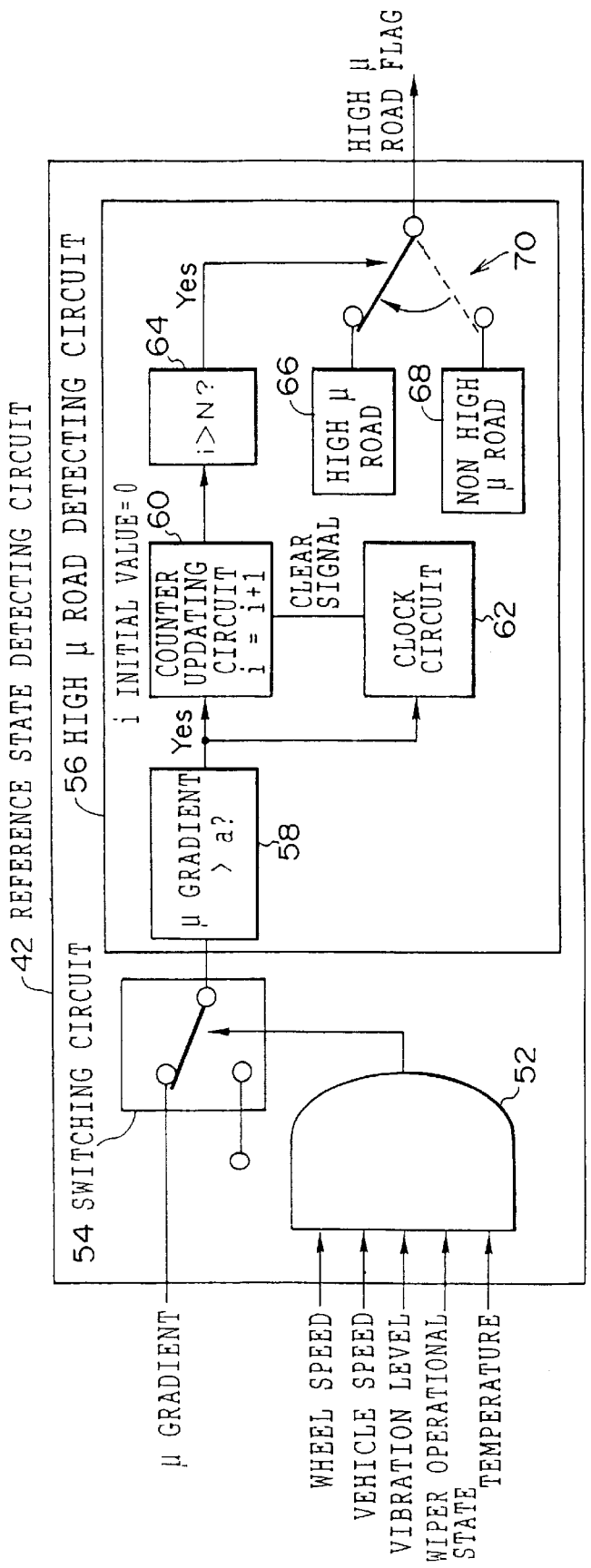
FIG. 4 is a diagram showing a reference state detecting circuit.

As shown in FIG. 4, the reference state detecting circuit 42 is provided with an AND circuit 52 into which are inputted wheel speeds of left and right wheels detected by the wheel speed sensors 12, the vehicle speed detected by the vehicle speed sensor 22, the vibration level calculated by the vibration level calculating circuit 16, a wiper operational state detected by the wiper operation detecting sensor 20, and the environmental temperature detected by the temperature sensor 18. The AND circuit 52 detects whether or not the vehicle is running in a straight line at a constant speed on a high μ road with a low vibration level from the road, and outputs a signal to a switching circuit 54. The switching circuit 54 switches to input the μ gradient from the road μ gradient calculating circuit 14 when a signal is applied from the AND circuit 52, and outputs to a high μ road detecting circuit 56. The high μ road detecting circuit 56 outputs a high μ road flag indicating a reference state, which is a state in which the grip state of the wheel with respect to the road is high, on the basis of output from the switching circuit 54.

Figure 7:
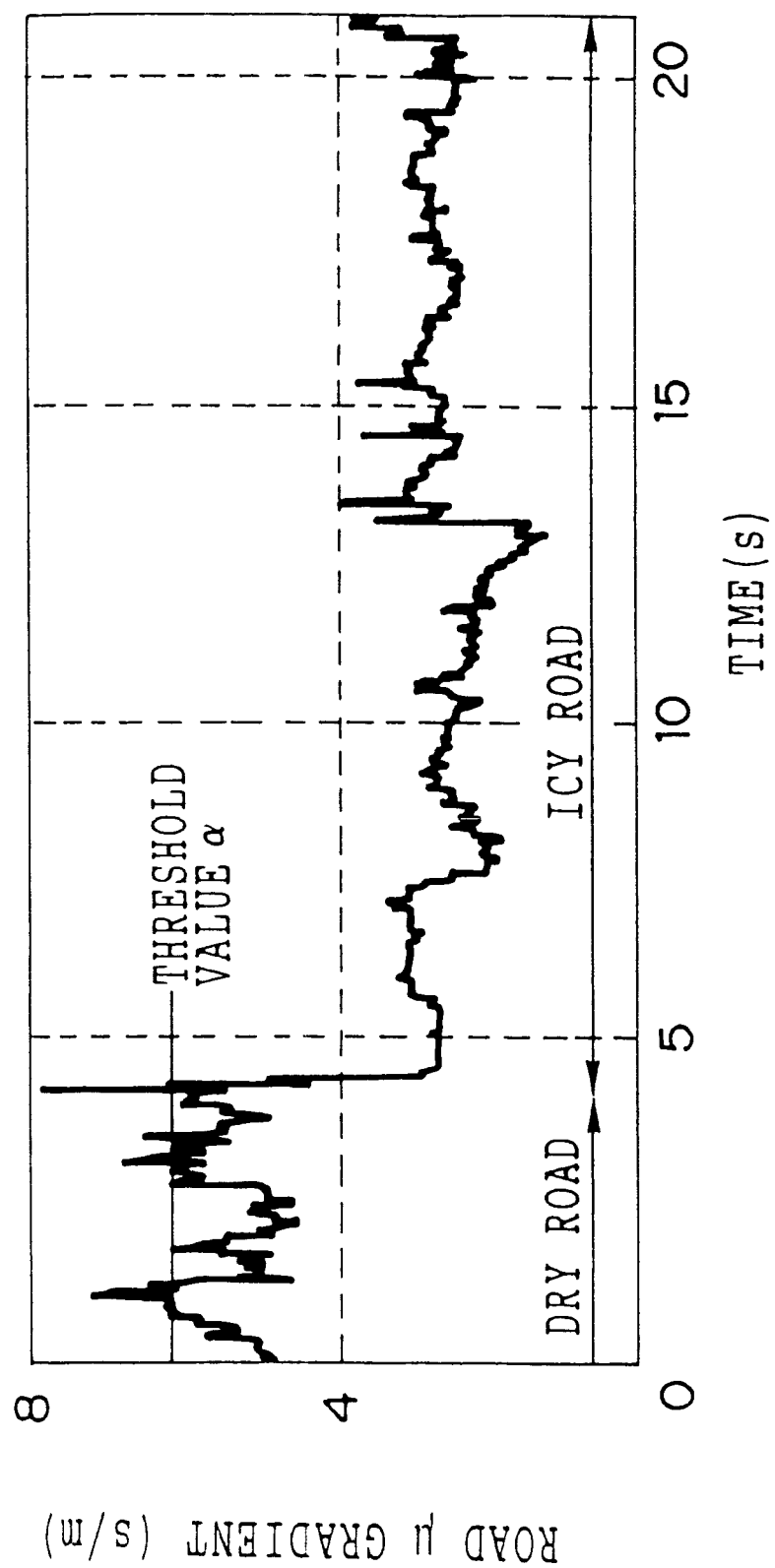
FIG. 7 is an explanatory view for explaining a threshold value in the reference state detecting circuit.

The high μ road detecting circuit 56 is provided with a comparing circuit 58 for determining whether the output from the switching circuit 54 (the μ gradient from the road μ gradient calculating circuit 14) is larger than a threshold value α (a value proximate to a maximum value of μ gradient when running on a high μ road, determined by previous experiment (refer to FIG. 7)), a counter 60 for counting (incrementing a variable i by 1) a number of times for which the μ gradient from the road μ gradient calculating circuit 14 is determined by the comparing circuit 58 to be larger than the threshold value α, a clock circuit 62 for resetting the count value of the counter 60 (i=0) when the count value is not updated for at least a certain time period, a comparator 64 for determining whether the count value (i) of the counter 60 is larger than a predetermined value N, and a switch 70 for switching to output a stored high μ road flag to a memory 66 when the count value (i) of the counter 60 is determined to be larger than the predetermined value N by the comparator 64 and to output a stored non high μ road flag to a memory 68 when the count value (i) is not determined to be larger than the predetermined value N. Further, the stored high μ road flag is outputted to the memory 66 when the count value (i) of the counter 60 is determined to be larger than the predetermined value N because there may be cases in which the μ gradient becomes larger than the threshold value because of noise or the road state even when the road is not a high μ road. Thus, the high μ road flag is prevented from being outputted in these cases.

Figure 5:
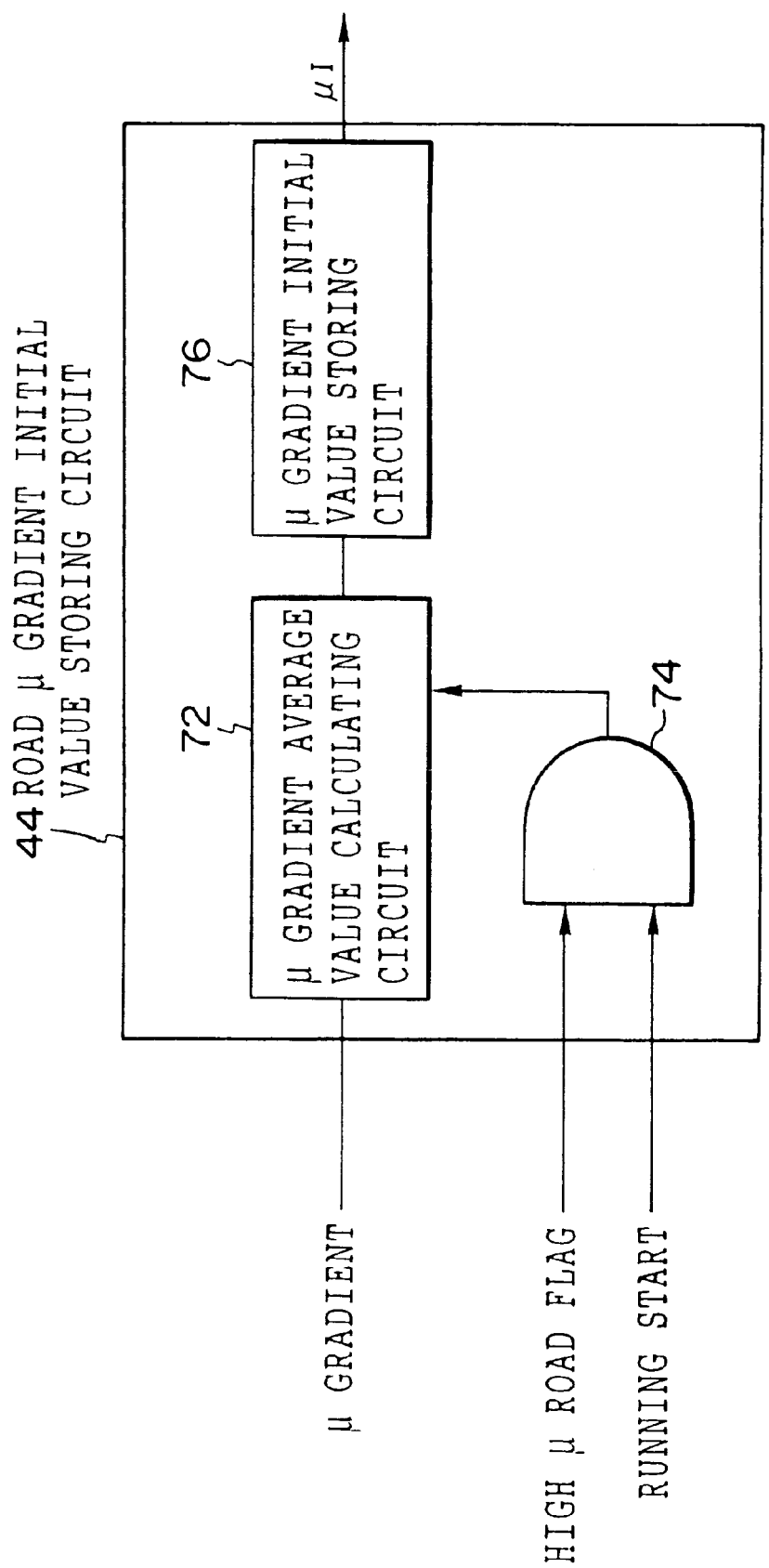
FIG. 5 is a diagram showing a road $\mu$ gradient initial value storing circuit.

As shown in FIG. 5, the road μ gradient initial value storing circuit 44 is provided with an AND circuit 74 for outputting a signal when both the high μ road flag and a signal from the vehicle speed sensor 22 (start running) are inputted. That is, when the vehicle starts running and the grip state of the wheel with respect to the road is high. The road μ gradient initial value storing circuit also includes a μ gradient average value calculating circuit 72 for averaging the μ gradient over a predetermined time period from when the signal from the AND circuit 74 is inputted, and a μ gradient initial value storing circuit 76 for storing an average μ gradient value calculated by the μ gradient average value calculating circuit 72 as a μ gradient initial value μI.

Figure 6:
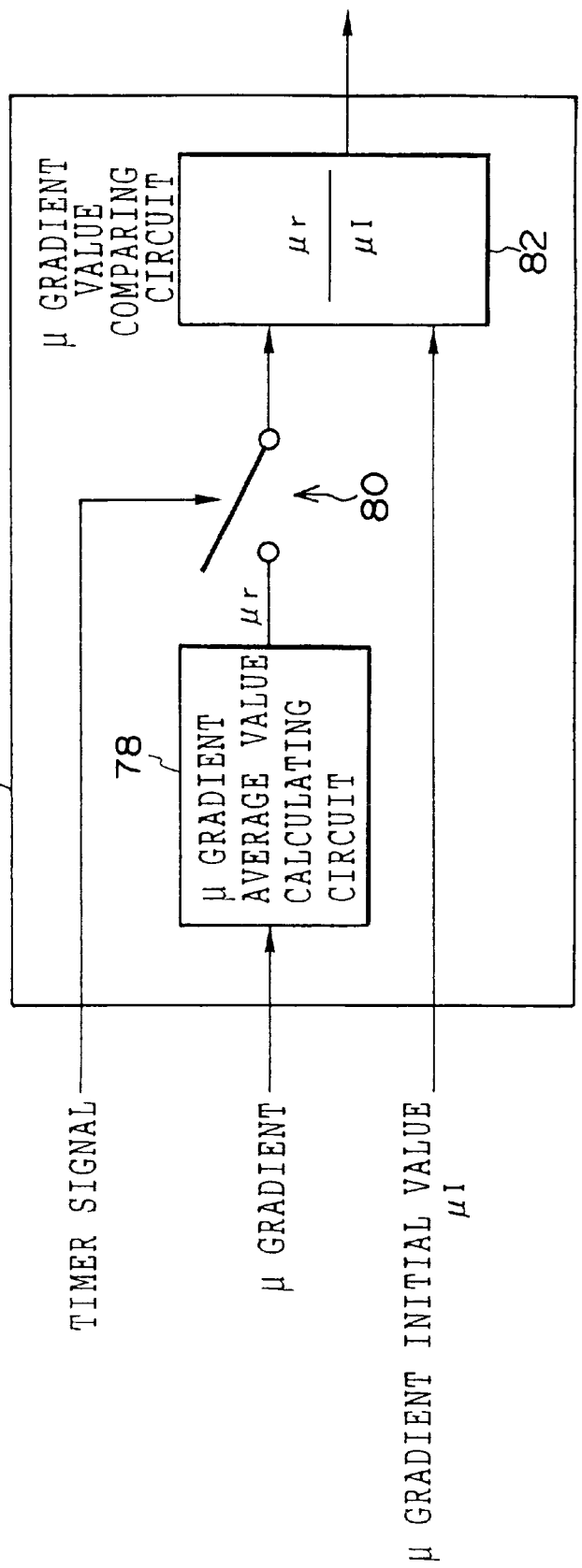
FIG. 6 is a diagram showing a road $\mu$ gradient comparing circuit.

As shown in FIG. 6, the road μ gradient comparing circuit 46 is provided with a μ gradient average value calculating circuit 78, for calculating an average value μr of μ gradients calculated by the road μ gradient calculating circuit 14 by a moving average processing, a switch 80 which is switched ON each time a timer signal is inputted from an unillustrated timer, a μ gradient value comparing circuit 82 for calculating a ratio (μr/μI) of the μ gradient initial value μI to the average μ gradient value μr and outputting a value representing the tire grip state (grip level).

Next, an explanation will be given of operation of the embodiment. The sensor abnormality detecting circuit 30 of the present embodiment detects for respective abnormalities of the yaw rate sensor 26, the steering angle sensor 28 and the cross acceleration sensor 29 when the grip level detected by the tire grip state detecting circuit 24 is high.

First, an explanation will be given of details of detecting of the grip state by the tire grip state detecting circuit 24. Explanation will be given initially of details of calculation by the road μ gradient calculating circuit 14 and the vibration level calculating circuit 16.

In the transfer function identifying circuit 34, digitized data of the detected wheel speed Δω1 are successively substituted in Equation (11) the least squares method is applied, the unknown parameter θ is estimated, and thus, the transfer function is identified.

Specifically, the detected wheel speed vibrations Δω1 are converted into digitized data Δω(k) (k=1, 2, 3, . . . ), N points of this data are sampled, and the parameter θ of the transfer function is estimated using the following least squares method equation.

$$\hat{\theta}(N) = \left[\sum_{k=1}^{N} \rho^{N-k} \zeta(k)\zeta^T(k)\right]^{-1} \left[\sum_{k=1}^{N} \rho^{N-k} \zeta(k)\zeta_{\nu 0}(k)\right] \quad \text{Equation (11)}$$

Here, an amount crowned with a symbol "^" is the estimated value.

Further, the above-described least squares method may be calculated in the form of a successive type least squares method for calculating the parameter θ by following recursion formulae.

$$\hat{\theta}(N) = \hat{\theta}(N-1) + h(N)\left[\xi_{\nu 0}(N) - \zeta^T(N)\hat{\theta}(N-1)\right] \quad \text{Equation (12)}$$

$$h(N) = \frac{P(N-1)\zeta(N)}{\rho + \zeta^T(N)P(N-1)\zeta(N)} \quad \text{Equation (13)}$$

$$P(N) = \frac{1}{\rho}\{I - h(N)\zeta^T(N)\}P(N-1) \quad \text{Equation (14)}$$

where notation ρ represents a so-called oblivion coefficient and is normally set to a value of 0.95 through 0.99. In this case, the initial value may be defined as follows.

$$\hat{\theta}(-1)=0, P(-1)=\alpha I, \quad \text{Equation}$$

α: Sufficiently large positive number

Further, as methods of reducing estimation errors of the above-described least squares method, there may be used various modified least squares methods. For the present embodiment, an explanation will be given of an example using the auxiliary variable method, which is a least squares method that introduces an auxiliary variable. In this method, at a stage of providing the relationship of Equation (9), with m(k) as an auxiliary variable, the parameter of the transfer function is estimated using the following equation.

$$\hat{\theta}(N) = \left[\sum_{k=1}^{N} \rho^{N-k} m(k)\zeta^T(k)\right]^{-1} \quad \text{Equation (15)}$$

-continued $$\left[\sum_{k=1}^{N} \rho^{N-k} m(k)\zeta_{v0}(k)\right]$$

Further, successive calculations are as follows.

$$\hat{\theta}(N) = \hat{\theta}(N-1) + h(N)\left[\xi_{v0}(N) - \zeta^T(N)\hat{\theta}(N-1)\right] \quad \text{Equation (16)}$$

$$h(N) = \frac{P(N-1)m(N)}{\rho + \zeta^T(N)P(N-1)m(N)} \quad \text{Equation (17)}$$

$$P(N) = \frac{1}{\rho}\{I - h(N)\zeta^T(N)\}P(N-1) \quad \text{Equation (18)}$$

The principle of the auxiliary variable method is as follows. When Equation (15) is substituted in Equation (16), the following equation is established.

$$\hat{\theta}(N) = \left[\sum_{k=1}^{N} \rho^{N-k} m(k)\zeta^T(k)\right]^{-1} \quad \text{Equation (19)}$$

$$\left[\sum_{k=1}^{N} \rho^{N-k} m(k)\xi_{v0}(k)\right]$$

Therefore, when the auxiliary variable is selected such that the second term of the right side of Equation (19) becomes null, the estimated value of θ coincides with a true value of θ. Hence, according to the present embodiment, ζ(k)=[−ξy1(k)−ξy2(k)]T, which is delayed to have no correlation with equation error r(k), is utilized as the auxiliary variable. That is, the following Equation is established.

$$m(k)=[-\xi y1(k-L)-\xi y2(k-L)]T \quad \text{Equation (20)}$$

where notation L represents a delay time.

After identification of the transfer function as described above, a physical amount related to the road μ gradient D0 is calculated in the calculating circuit 36 as follows.

$$\frac{\hat{a}_2}{\hat{a}_1} = \frac{D_0}{J_1 + J_2} \quad \text{Equation (21)}$$

The physical amount related to the road μ gradient D0 is calculated by Equation (21). Then, if, for example, the physical amount is small, it can easily be determined that a friction characteristic between the tire and the road is in a saturated state.

Figure 8:
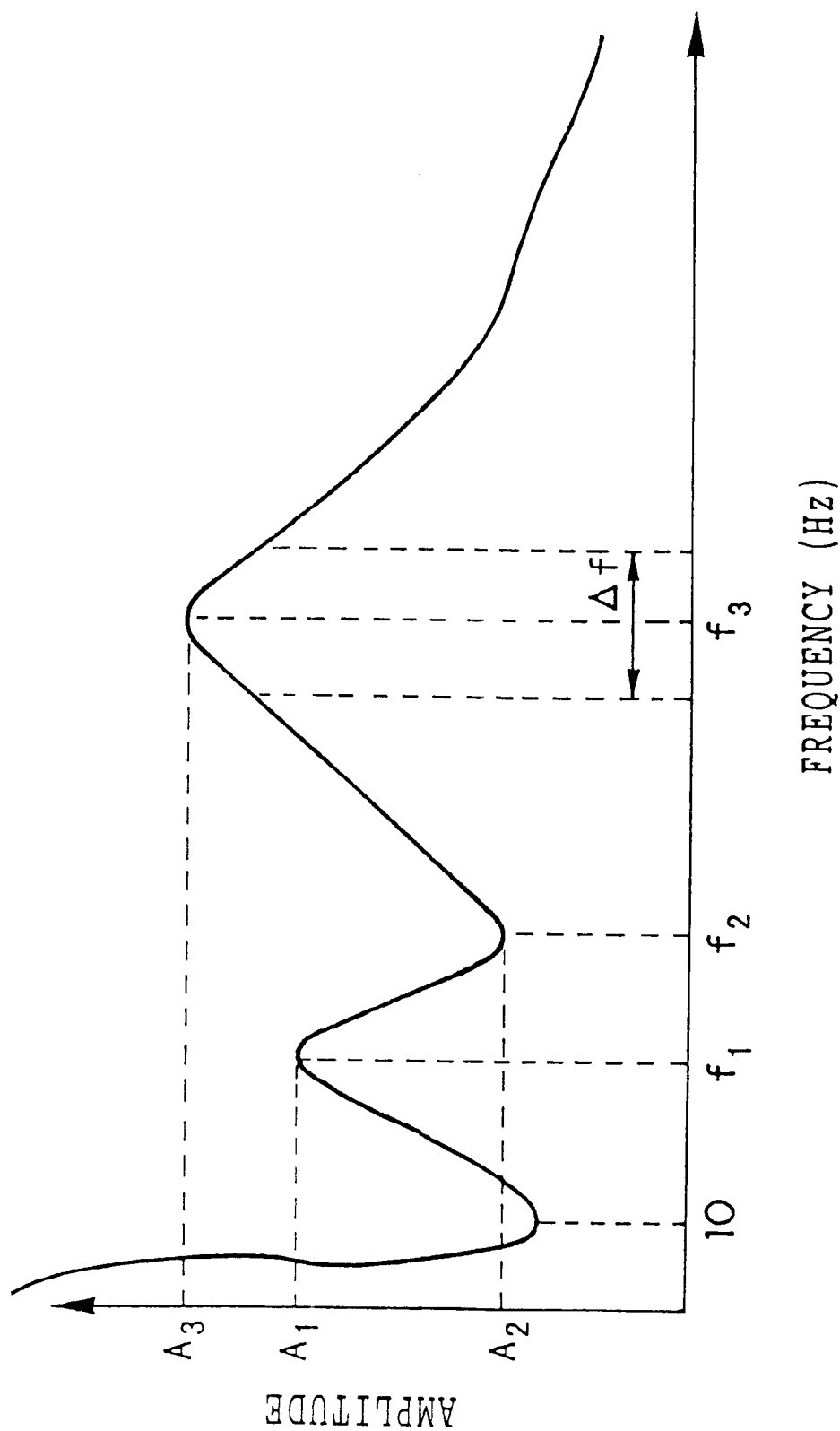
FIG. 8 is a graph showing a relationship between frequency and amplitude of a wheel speed signal.

Meanwhile, when the detected wheel speed signal is analyzed in relation to frequency by the wheel speed sensors 12, as shown in FIG. 8, there are two resonance points and one anti-resonance point. Of the two resonance points, the resonance point at the low frequency side is a front and rear resonance point dependent on tire inertia and the frequency thereof is f1 (15 to 20 Hz). The resonance point at the high frequency side is a twist resonance point dependent on pneumatic tire pressure and tire rubber elasticity, and the frequency thereof is f3 (35 to 40 Hz). Further, the wheel speed signal has the anti-resonance point, which is a dead zone with respect to various signals and the frequency thereof is f2 (20 to 25 Hz). The band pass filter 38 according to the present embodiment extracts the wheel speed signal at a predetermined range Δf that includes the twist resonance point (frequency f3) from the wheel speed signal detected by the wheel speed sensors 12. Further, the band pass filter 38 may extract a wheel speed signal having a predetermined range Δf that includes the front and rear resonance point or the anti-resonance point, rather than the twist resonance point. The calculating circuit 40 calculates a vibration level G(N) of the wheel speed signal from the following equation. Further, the output of the band pass filter 38 is designated by notation ω(k).

$$G(N) \stackrel{def}{=} \sum_{k=1}^{N} \rho^{N-k} \omega(k)^2, \quad \text{Equation}$$

ρ: Oblivion coefficient=about 0.99

Further, in practice, the calculating circuit 40 successively calculates the following recursion formula at each time of calculation.

$$G(N)=\rho G(N-1)+\omega(N)^2 \quad \text{Equation}$$

The vibration level is calculated by the calculating circuit 40 in this way because the road μ gradient may not be estimated properly when riding over a protrusion or the like.

Figure 9:
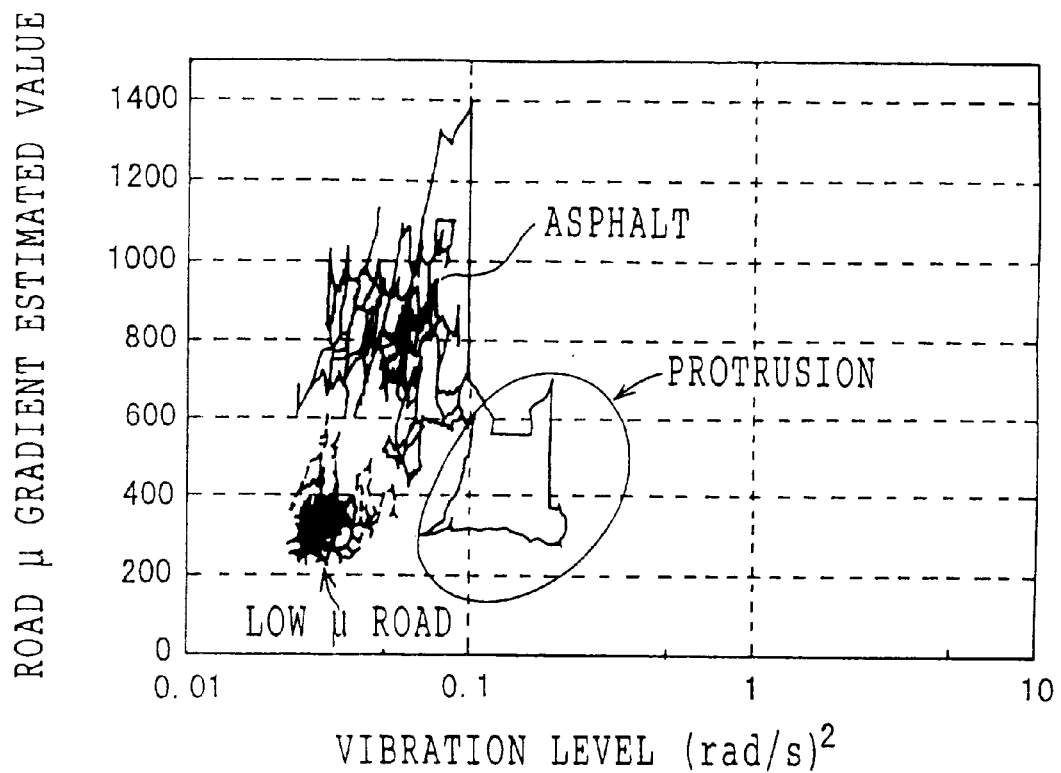
FIG. 9 is a graph showing relationships between vibration level of the wheel speed signal and road $\mu$ gradient for an asphalt road and for a low $\mu$ road.
Figure 10:
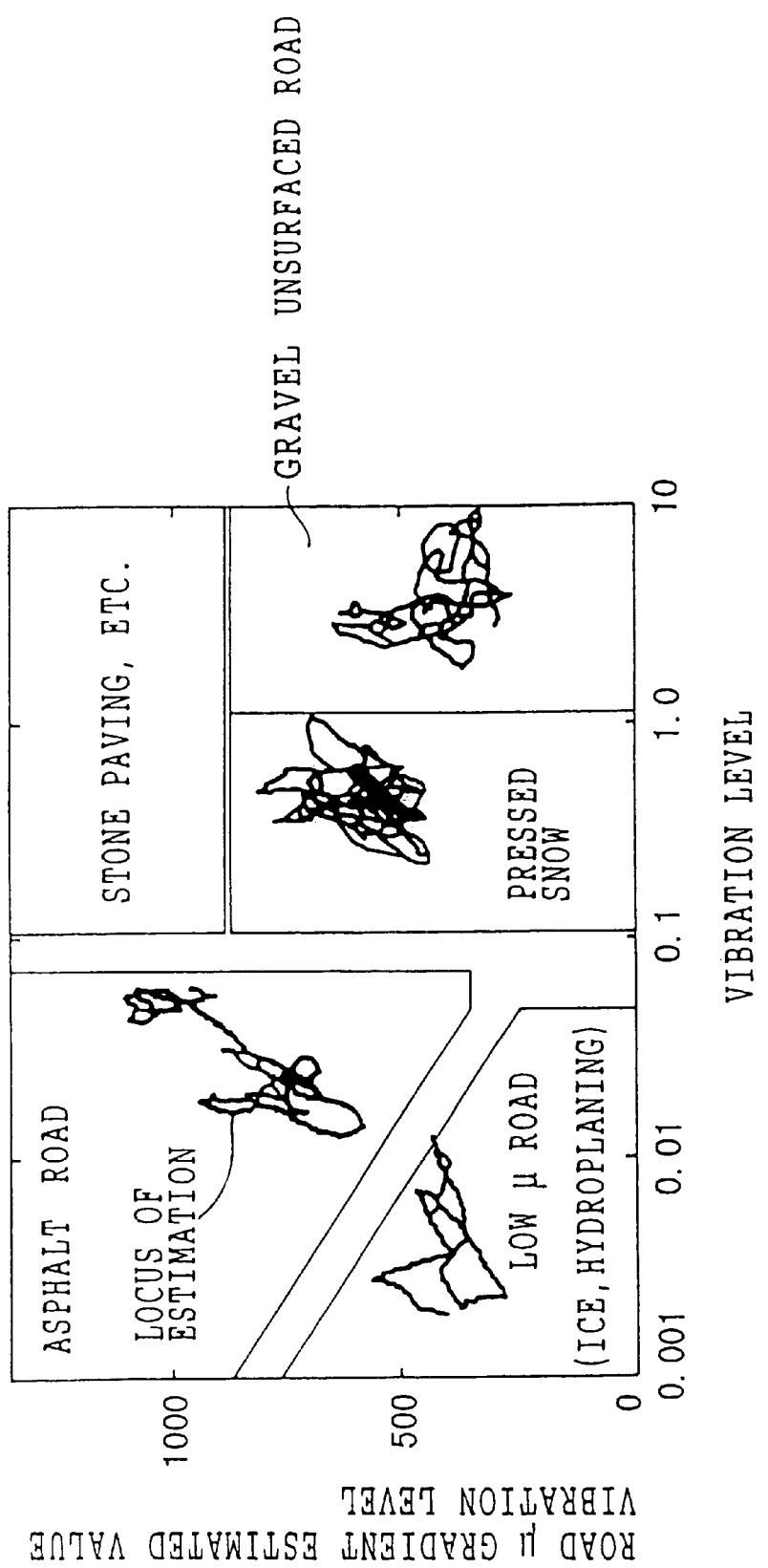
FIG. 10 is a graph showing relationships between vibration level of the wheel speed signal and the road $\mu$ gradient for each of road states.

Meanwhile, when the vibration level and the estimated value of the road μ gradient provided in this way are plotted for an asphalt road and for a low μ road, as shown in FIG. 9, the asphalt road and the low μ road are shown to be clearly different from each other and even when the vehicle rides over a projection on the asphalt road, the riding over is recognized to clearly differentiate from a region in the low μ road. When the inventors calculated a relationship between vibration level and road μ gradient for respective various road states in view of the above-described facts, as shown in FIG. 10, the vibration level and the estimated value of the road μ gradient can be seen from experiment to be clearly different for respective road states, for example, a low μ road, asphalt road, stone paving road, pressed snow road, gravel and unsurfaced road. That is, for example, the estimated value of the road μ gradient is provided with a more or less smaller value in the pressed snow road than in the high μ road (asphalt road, stone paving road) and regions have differences in vibration levels. The gravel road is in a region having a higher vibration level but the estimated value of the road μ gradient is lower than that of the high μ road.

Here, the AND circuit 52 of the reference state detecting circuit 42 is inputted with the wheel speeds of left and right wheels detected by the wheel speed sensors 12, the vehicle speed detected by the vehicle speed sensor 22, the vibration level calculated by the vibration level calculating circuit 16, the wiper operational state detected by the wiper operation detecting sensor 20 and the environmental temperature detected by the temperature sensor 18.

That is, it can be determined from the wheel speed sensors 12 whether the vehicle is advancing in a straight line, by comparing the wheel speeds of the left and right wheels. It can be determined from the vehicle speed detected by the vehicle speed sensor 22 whether the vehicle is running at a constant speed. It can be assumed from the wiper operational state detected by the wiper operation detecting sensor 20 that rain is not falling when the wiper is not operated, that is, that the road is a dry road. Further, it can be determined from the environmental temperature detected by the temperature sensor 18 whether the road is frozen. Further, it can be determined from the vibration level calculated by the vibration level calculating circuit 16 and the environmental temperature detected by the temperature sensor 18 that when the vibration level is small (for example, 0.01) and the road is not frozen, from the relationship shown in FIG. 10, the vehicle is running on an asphalt road (high μ road). Further, the AND circuit 52 outputs the signal when it is detected that the vehicle is advancing straight, at a constant speed, on a high μ road having a low vibration level.

The switch circuit 54 switches output thereof to the μ gradient from the road μ gradient calculating circuit 14 when the signal is inputted from the AND circuit 52. The comparator 58 determines whether the output from the switch circuit 54 (μ gradient from the road μ gradient calculating circuit 14) is larger than the threshold value α. The counter 60 counts (increment variable i by 1) for the number of times of determination by the comparing circuit 58 that the μ gradient from the road μ gradient calculating circuit 14 is larger than the threshold value α. Further, when the count value is not updated for a certain time period or more, the count value of the counter 60 is reset (i=0) by a signal from the clock circuit 62. The comparator 64 determines whether the count value (i) of the counter 60 is larger than the predetermined value N. The switch 70 outputs the stored high μ road flag to the memory 66 when the count value (i) of the counter 60 is determined to be larger than the predetermined value N by the comparator 64. Further, the stored high μ road flag is outputted to the memory 66 when the count value (i) of the counter 60 is larger than the predetermined value N and, accordingly, even in a case in which the μ gradient becomes larger than the threshold value because of noise or road state, even when the road is not a high μ road, the high μ road flag can be prevented from being outputted.

The AND circuit 74 of the road μ gradient initial value storing circuit 44 outputs a signal when the high μ road flag and a signal (start running) from the vehicle speed sensor 22 are inputted, that is, when the vehicle starts running and the grip state of the wheel with respect to the road is high. The μ gradient average value calculating circuit 72 averages μ gradients over a predetermined time period from when the signal from the AND circuit 74 is inputted. Further, the μ gradient initial value storing circuit 76 stores the average μ gradient value calculated by the μ gradient average value calculating circuit 72 as the μ gradient initial value μI.

Meanwhile, the μ gradient average value calculating circuit 78 of the road μ gradient comparing circuit 46 calculates the average value μr of μ gradients calculated by the road μ gradient calculating circuit 14 by a moving average processing. Further, when a timer signal is inputted, the switch 80 is turned ON, and the average μ gradient value μr calculated by the μ gradient average value calculating circuit 78 is inputted to the μ gradient value comparing circuit 82, the ratio (μr/μI) of the μ gradient initial value μI to the average μ gradient value μr is calculated, and a value (grip level) representing the tire grip state is outputted.

Figure 11:
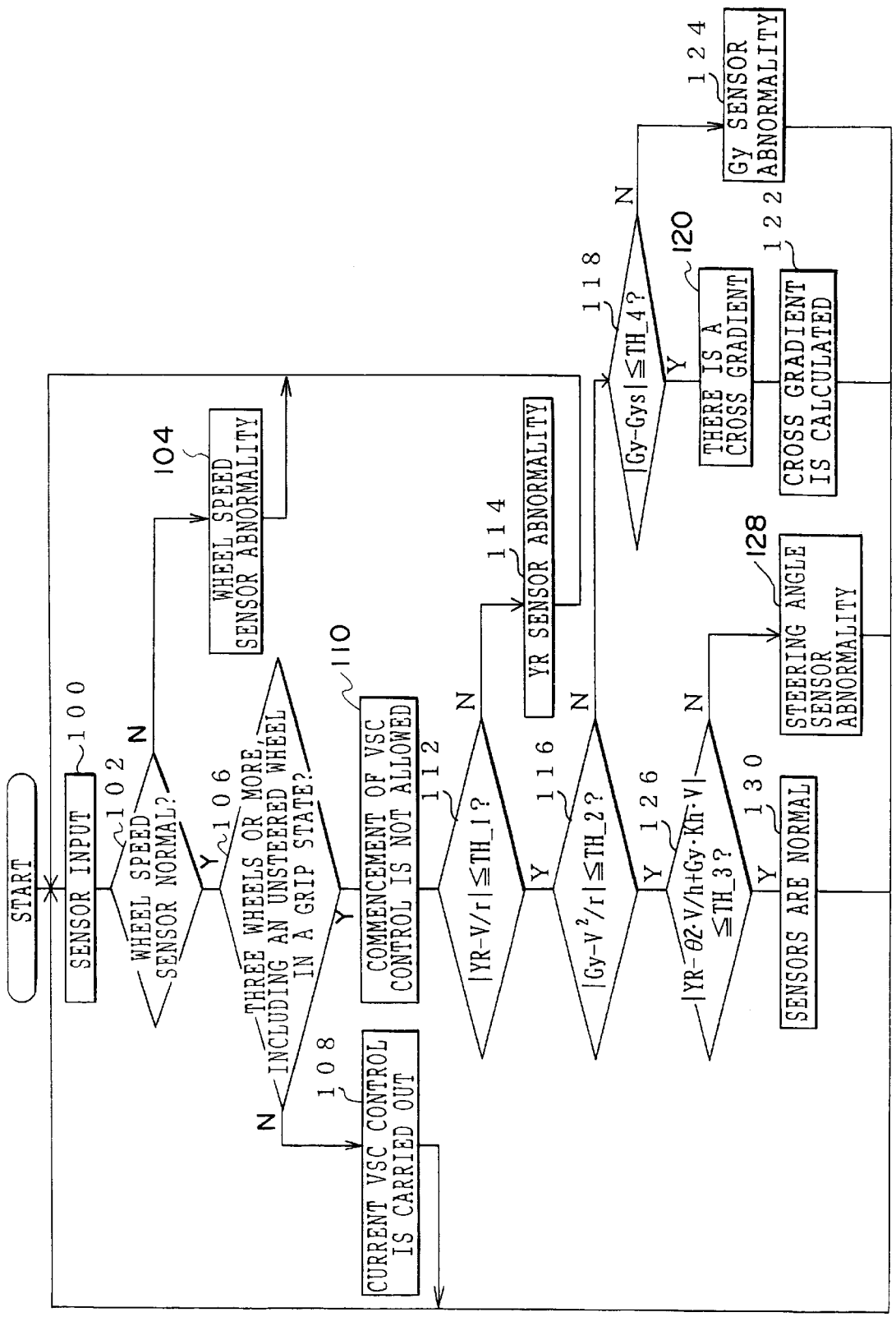
FIG. 11 is a flowchart showing flow of processing of a sensor abnormality detecting circuit according to a first embodiment.

Next, explanation will be given of specific operations of the sensor abnormality detecting circuit 30 according to the present embodiment with reference to a flowchart shown in FIG. 11.

First, at step 100, the wheel speed signals outputted from the wheel speed sensors 12, the yaw rate signal indicating the yaw rate outputted from the yaw rate sensor 26, the steering angle signal indicating the steering angle of the steering wheel and outputted from the steering angle sensor 28, and the cross acceleration signal indicating the cross acceleration and outputted from the cross acceleration sensor 29 are inputted. Thus, the sensor abnormality detecting circuit 30 can be provided with the wheel speeds, a value of the yaw rate (hereinafter, referred to as "yaw rate sensor value YR"), a value of the steering angle of the steering wheel (hereinafter, referred to as "steering angle sensor value D") and a value of the cross acceleration (hereinafter, referred to as "cross G sensor value Gy").

At next step 102, on the basis of the wheel speed signal provided at step 100, it is determined whether the wheel speed sensor 12 is normal. In the normal case (affirmative determination), the operation proceeds to step 106. In the abnormal case (negative determination), the operation proceeds to step 104, and operation returns to step 100 after storing information indicating that the wheel speed sensor 12 is abnormal to a memory, not illustrated, provided at the sensor abnormality detecting circuit 30. Here, at the above-described step 102, it can be determined that the wheel speed sensor 12 is not normal if an acceleration calculated from wheel speed signals inputted from the wheel speed sensor 12 is acceleration which cannot be provided in fact, or if the wheel speed signal remains unchanged at a constant value.

At next step 106, by comparing the grip level of each of four wheels inputted from the tire grip state detecting circuit 24 with a predetermined threshold value, it is determined whether three wheels or more, including an unsteered wheel, are in the grip state. Here, in the present embodiment, for the threshold, there is applied a value provided previously by experiment, which is a value of a boundary between the grip state and a slipping state. Further, here, the unsteered wheel is included in the determination of whether the grip state is brought about because, in this first embodiment, the yaw rate is derived at step 112 on the basis of data other than the output signal from the yaw rate sensor 26, as mentioned later and, in this case, when the unsteered wheel is in the grip state, the yaw rate can be derived highly accurately. Further, whether three or more wheels are in the grip state is determined because in the case of two wheels or less it cannot be determined whether the wheels are truly in the grip state or not. That is, for example, there are cases where two rear wheels are in the grip state, but two front wheels are not in the grip state.

When it is determined that three or more wheels, including an unsteered wheel, are not in the grip state (negative determination), it is assumed that accuracy of abnormality detection of the sensors that are objects of abnormality detection by the sensor abnormality detecting circuit 30 (yaw rate sensor 26, steering angle sensor 28, and cross acceleration sensor 29) is low and it is assumed that the vehicle body is in an unstable state and VSC control is needed. Then, existing (current) VSC control is carried out and operation returns to step 100. In the conventional VSC control, simple abnormality determination of various sensors is carried out prior to actual VSC control and the VSC control is carried out on the basis of results of this determination.

Meanwhile, at step 106, if it is determined that three or more wheels including an unsteered wheel are in the grip state (affirmative determination), it is assumed that accuracy of abnormality detection of the sensors which are objects of the abnormality detection is high, it is assumed that the vehicle body is in a stable state, and VSC control is not needed. Operation proceeds to step 110, a state of not carrying out VSC control is set, and thereafter, the operation proceeds to step 112 and then abnormality detection processing of the sensors that are objects of the abnormality detection is carried out.

Further, in the following abnormality detection processing, abnormality detection of the various sensors is carried out on the basis of the following three equations, Equation (22) through Equation (24).

$YR = V/r$ Equation (22)

$Gy = V^2/r$ Equation (23)

Figure 12:
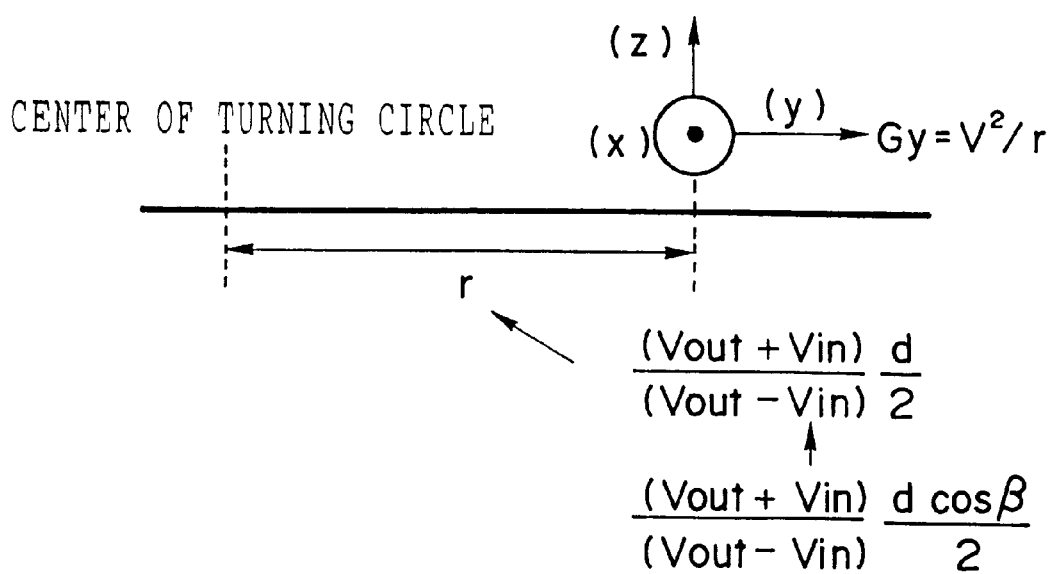
FIG. 12 is a schematic view for explaining processing by the sensor abnormality detecting circuit according to the first embodiment.

$YR = \theta 2 \cdot V/h - Gy \cdot Kh \cdot V$ Equation (24)

where V is vehicle speed calculated from wheel speed, Gy is cross G sensor value, Yr is yaw rate sensor value, θ2 is actual steering angle (produced by dividing a steering angle derived from the steering angle sensor value D by a gear ratio of steering), Kh is a stability factor, h is wheel base, and r is turn radius of the vehicle body (calculated from a difference between left and right wheel speeds). The turn radius r is calculated by the following equation (25), as shown in FIG. 12.

$$r = \frac{(Vout + Vin)}{(Vout - Vin)} \frac{d\cos\beta}{2} = \frac{(Vout + Vin)}{(Vout - Vin)} \frac{d}{2} \qquad \text{Equation (25)}$$

where Vin is vehicle speed of unsteered wheel at an inner side of turn, Vout is vehicle speed of unsteered wheel at an outer side of turn, d is tread, and β is vehicle body slip angle of unsteered wheel shaft. Further, modification in Equation (25) is carried out on the basis of $\cos\beta \approx 1$.

First, at step 112, utilizing Equation (22), it is determined whether an absolute value of a difference between the yaw rate sensor value YR and a value of the yaw rate calculated on the basis of the turn radius r (V/r), is equal to or smaller than a previously determined threshold value TH_1. When this absolute value is equal to or smaller than the threshold value TH_1 (affirmative determination), the yaw rate sensor 26 is regarded as normal, and operation proceeds to step 116. If the absolute value is not equal to or smaller than the threshold value TH_1 (negative determination), the yaw rate sensor is regarded as abnormal, operation proceeds to step 114, and operation returns to step 100 after storage of information indicating that the yaw rate sensor 26 is abnormal to the memory, not illustrated. Here, the threshold value TH_1 has been assigned a value previously calculated by experiment as a value in which when the absolute value of the difference between the yaw rate sensor value YR and the calculated yaw rate value is equal to or smaller than that value the yaw rate sensor 26 can be regarded as normal, even after taking account of fabrication error.

At step 116, utilizing Equation (23), it is determined whether the absolute value of a difference between the cross G sensor value Gy and a value of cross acceleration calculated on the basis of turn radius r (V²/r) is equal to or smaller than a threshold value TH_2. When this absolute value is equal to or smaller than the threshold value TH_2 (affirmative determination), the cross acceleration sensor 19 is regarded as normal, and operation proceeds to step 126. When the absolute value is not equal to or smaller than the threshold value TH_2 (negative determination), it is assumed that either the cross acceleration sensor 29 is abnormal or there is a comparatively large cross gradient, and operation proceeds to step 118. Here, the threshold value TH_2 has been assigned a value previously calculated by experiment as a value in which when the absolute value of the difference between the cross G sensor value Gy and the calculated value of cross acceleration is equal to or smaller than that value, the cross acceleration sensor 29 can be regarded as normal, even after taking account of fabrication error.

At step 118, it is determined whether an absolute value of a difference between the cross G sensor value Gy and a cross acceleration Gys calculated on the basis of a vehicle body slip angle measured by an illustrated slip angle meter is equal to or smaller than a previously determined threshold value TH_4. Here, the threshold value TH_4 has been assigned a value previously calculated by experiment as a value in which when the absolute value of the difference between the cross G sensor value Gy and the cross acceleration Gys is equal to or smaller than that value, the cross acceleration sensor 29 can be regarded as normal, even after taking account of fabrication error.

Here, the cross acceleration Gys is calculated on the basis of the vehicle body slip angle for the following reason.

Cornering power is constant in the grip state and cornering force can be estimated from the vehicle body slip angle. Here, the cornering force is proportional to the cross acceleration. Therefore, in the grip state, the cross acceleration can be estimated from the vehicle body slip angle.

At step 118, If it is determined that the absolute value of the difference between the cross G sensor value Gy and the cross acceleration Gys is equal to or smaller than the threshold value TH_4 (affirmative determination), it is assumed that the cross acceleration sensor 29 is normal and the cross gradient is large, the operation proceeds to step 120. Then, after storing of information indicating that there is a large cross gradient to the memory, not illustrated, at step 122, the cross gradient θ3 is calculated by the following equation (26) and stored to the memory, not illustrated, and operation returns to step 100.

$$\cos\theta 3 = \frac{YR \cdot V - Gy}{g} \qquad \text{Equation (26)}$$

where notation g represents load. Further, the cross gradient θ3 stored here can be used for preventing erroneous operation in the case of carrying out the VSC control. That is, for example, in a state in which the cross acceleration sensor 29 is determined to be abnormal, conceivable states are a state in which the cross acceleration sensor 29 is actually abnormal and a state in which the cross acceleration sensor 29 is erroneously determined because the cross gradient is large. Therefore, when the cross gradient θ3 is provided with large value, the cross acceleration sensor 29 can be normal and there can be carried out VSC control in consideration of this respect.

Further, at step 118, if it is determined that the absolute value of the difference between the cross G sensor value Gy and the cross acceleration Gys is not equal to or smaller than the threshold value TH_4 (negative determination), the cross acceleration sensor 29 is regarded as abnormal, operation proceeds to step 124, information indicating that the cross acceleration sensor 29 is abnormal is stored to the memory, and then, operation returns to step 100.

Meanwhile, at step 126, utilizing Equation (24), it is determined whether an absolute value of a difference between the yaw rate sensor value YR and a value of the yaw rate calculated on the basis of the cross G sensor value Gy and the actual steering angle θ2(θ2·V/h−Gy·Kh·V), is equal to or smaller than a previously determined threshold value TH_3. When this absolute value is equal to or smaller than the threshold value TH_3 (affirmative determination), the steering angle sensor 28 is regarded as normal, and operation proceeds to step 130. When the absolute value is not equal to or smaller than the threshold value TH_3 (negative determination), the steering angle sensor 28 is regarded as abnormal and operation proceeds to step 128. Here, the threshold value TH_3 has been assigned a value previously calculated by experiment as a value in which when the absolute value of the difference between the yaw rate sensor value YR and the above-described calculated value of the yaw rate is equal to or smaller than that value, the steering angle sensor 28 can be regarded as normal, even after taking account of fabrication error.

At step 128, information indicating that the steering angle sensor 28 is abnormal is stored to the memory, not illustrated, and operation returns to step 100. At step 130, information indicating that all of the yaw rate sensor 26, the steering angle sensor 28 and the cross acceleration sensor 29 are normal is stored to the memory, not illustrated, and operation returns to step 100.

The processing at step 106 corresponds to a prohibiting device of the present invention and the processing at step 112 through step 130 corresponds to an abnormality detecting device of the present invention.

As has been explained in detail, with the apparatus of detecting abnormality of the vehicular sensor according to the first embodiment, when the degree of grip of the wheel with respect to the road is low, abnormality detection of the sensors that are objects of abnormality detection is prohibited and, therefore, erroneous detection of abnormality of the sensors can be preemptively prevented.

Further, in the case of the apparatus for detecting abnormality of a vehicular sensor according to the first embodiment, abnormalities of the cross acceleration sensor, the yaw rate sensor and the steering angle sensor can be accurately detected and, accordingly, control can be made highly accurate in the case of applying the apparatus to detecting cross-slipping of a vehicle with the cross acceleration sensor, the yaw rate sensor and the steering angle sensor for a VSC system.

Second Embodiment

Although according to the first embodiment, explanation has been given of the embodiment for a case in which the cross gradient cannot be estimated in advance. However, for a second embodiment, explanation will be given of a mode in a case in which the cross gradient can be estimated in advance. Further, structure of an apparatus for detecting abnormality of a vehicle sensor according to the second embodiment and operations thereof, other than the sensor abnormality detecting circuit 30, are the same as in the first embodiment and, accordingly, explanation thereof will be omitted here.

Figure 13A:
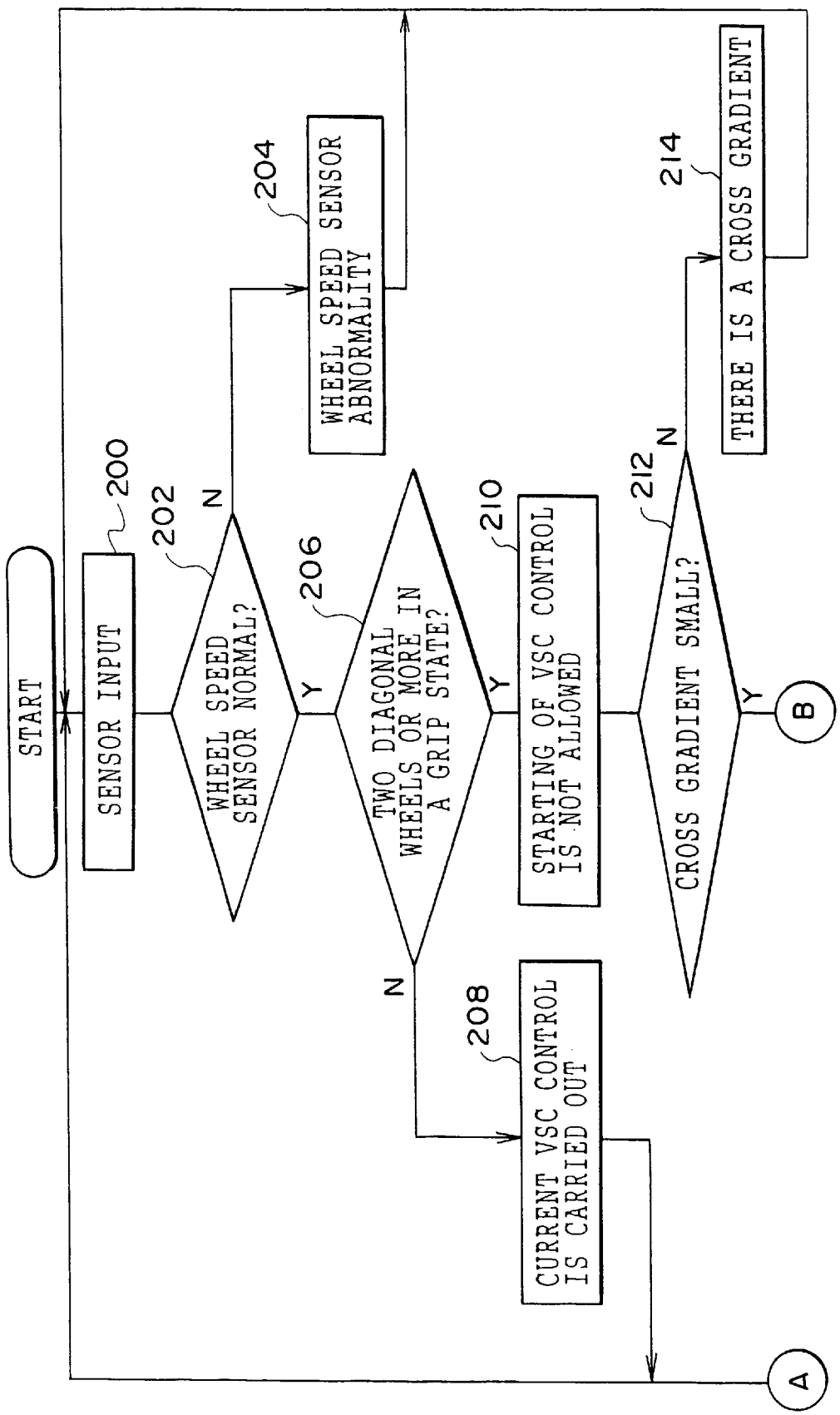

Explanation will be given of specific operation of the sensor abnormality detecting circuit 30 according to the second embodiment with reference to a flowchart shown in FIG. 13 as follows.

First, at step 200, the wheel speed signals outputted from the wheel speed sensors 12, the yaw rate signal indicating the yaw rate and outputted from the yaw rate sensor 26, the steering angle signal indicating the steering angle of the steering wheel and outputted from the steering angle sensor 28, and the cross acceleration signal indicating that cross acceleration and outputted from the cross acceleration sensor 29 are inputted. Thus, the sensor abnormality detecting circuit 30 can be provided with the wheel speeds, the yaw rate sensor value YR, the steering angle sensor value D and the cross G sensor value Gy.

At next step 202, on the basis of the wheel speed signal provided at step 200, it is determined whether the wheel speed sensor 12 is normal. In the normal case (affirmative determination), operation proceeds to step 206. In the abnormal case (negative determination), the operation proceeds to step 204, information indicating that the wheel speed sensor 12 is abnormal is stored to a memory, not illustrated, provided at the sensor abnormality detecting circuit 30, and then, the operation returns to step 200. Here, at step 202, similarly to the first embodiment, the wheel speed sensor 12 can be determined as not normal when the acceleration calculated on the basis of the wheel speed signal inputted from the wheel speed sensor 12 is an acceleration which cannot be provided in fact or if the wheel speed signal remains unchanged at a constant value.

At step 206, by comparing the grip level of each of four wheels inputted from the tire grip state detecting circuit 24 with a previously determined threshold value, it is determined whether at least two wheels at diagonally opposed positions are in the grip state. Here, the threshold value in the embodiment has been assigned a value previously calculated from experiment to be a value of a boundary between the grip state and the slipping state. Further, here, the object of determination of whether the grip state is brought about is constituted by the two wheels at diagonally opposed positions because, thereby, an unsteered wheel can be included in the object, both a front wheel and a rear wheel can be included. Thus, the yaw rate can be derived highly accurately on the basis of signals other than the output signal from the yaw rate sensor 26 and of accuracy determination of the grip states can be improved.

When it is determined that at least two wheels at diagonally opposed positions are not in the grip state (negative determination), it is assumed that accuracy of abnormality determination of the sensors constituting the object of the abnormality detection by the sensor abnormality detecting circuit 30 (yaw rate sensor 26, steering angle sensor 28, and cross acceleration sensor 29) is low, it is assumed that the vehicle body is in an unstable state and VSC control is needed, the operation proceeds to step 208, the conventional VSC control is carried out, and operation returns to step 200. In the conventional VSC control, simple abnormality determination of the various sensors is carried out prior to actual VSC control and VSC control is carried out on the basis of the result of this determination.

Meanwhile, at step 206, when the at least two wheels at diagonally opposed positions are determined to be in the grip state (affirmative determination), it is assumed that the accuracy of the abnormality detection of the sensors that are objects of the abnormality determination is high, and it is assumed that the vehicle body is in the stable state and that VSC control is not needed. Then, operation proceeds to step 210, a state of not carrying out the VSC control is set and then, operation proceeds to step 212.

At step 212, it is determined whether the cross gradient is small. If the cross gradient is small (affirmative determination), the operation proceeds to step 216. If the cross gradient is not small (negative determination), operation proceeds to step 214, information indicating that there is a comparatively large cross gradient is stored to the memory, not illustrated, and then operation returns to step 200.

The determination of whether the cross gradient is small at step 212 is carried out as follows. That is, a load distribution applied to the left and right wheels by cross acceleration when running on a flat road is different from a load distribution applied to the left and right wheels when running on a road having a cross gradient, because there is a load distribution of a steady state component produced by a movement of load to the left or right by the cross gradient. The difference in the load distribution is determined by observing strokes (distances between suspension arms and the vehicle body) of suspensions of the left and right wheels. On the basis thereof, the cross acceleration can be estimated. Further, the value of the cross acceleration can be derived from the wheel speed as $V^2/r$, shown also in the first embodiment. Therefore, when an absolute value of a difference between the cross acceleration derived from the wheel speed and a cross acceleration estimated on the basis of the strokes of the suspensions of the left and right wheel is equal to or smaller than a previously determined threshold value, the cross gradient can be regarded as being small. Therefore, the threshold value at this time has been assigned a value previously calculated by experiment as a value in which when the absolute value is equal to or smaller than that value, a cross gradient that enables highly accurate abnormality detection of the sensors that are objects of the abnormality detection can be provided.

From step 216 on, is carried out abnormality detection processing of the sensors that are objects of the abnormality detection.

Further, in the following abnormality detection processings, the abnormality detection of the respective sensors is carried out on the basis of the following three equations, Equation (27) through Equation (29)

$$Gy = V^2/r2 \quad \text{Equation (27)}$$

$$YR = V/r2 \quad \text{Equation (28)}$$

$$YR = Gy/V \quad \text{Equation (29)}$$

Figure 14:
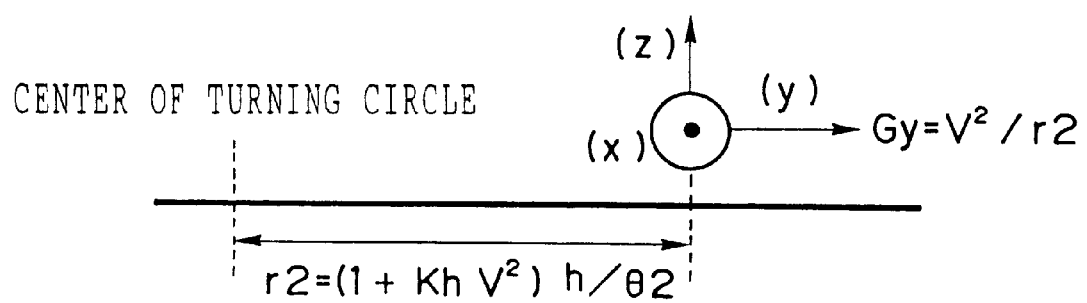
FIG. 14 is a schematic view for explaining processing of the sensor abnormality detecting circuit according to the second embodiment.

Here, notation r2 represents a turn radius of the vehicle body calculated from the vehicle body speed and the steering angle and, as shown in FIG. 14, the turn radius r2 is calculated by the following Equation (30).

$$r2 = (1 + Kh \cdot V2) \cdot h/\theta 2 \quad \text{Equation (30)}$$

Further, Equation (30) is established when the cross gradient is small and, here, operation is limited to the case of a small cross gradient, as determined in step 212. Therefore, Equation (30) is applicable. Further, parameters other than the turn radius r2 in Equation (27) through Equation (30) are similar to those in the first embodiment.

First, at step 216, utilizing Equation (27), it is determined whether an absolute value of a difference between the cross G sensor value Gy and a value of the cross acceleration calculated on the basis of the turn radius r2 ($V^2/r2$), is equal to or smaller than a previously determined threshold value TH_6. If this absolute value is equal to or smaller than the threshold value TH_6 (affirmative determination), operation proceeds to step 220, a state Y1 indicating that the steering angle sensor 28 and the cross acceleration sensor 29 are normal is stored to the memory, not illustrated, and then the operation proceeds to step 222.

Meanwhile, at step 216, if it is determined that the absolute value is not equal to or smaller than the threshold value TH_6 (negative determination), operation proceeds to step 218, a state N1 is stored to the memory, not illustrated, and then the operation proceeds to step 222. Here, the threshold value TH_6 has been assigned a value previously calculated by experiment as a value that when the absolute value of the difference between the cross G sensor value Gy and the calculated cross acceleration value is equal to or smaller than that value, the steering angle sensor 28 and the cross acceleration sensor 29 can be regarded as normal, even after taking account of fabrication error.

At step 222, utilizing Equation (28), it is determined whether an absolute value of a difference between the yaw rate sensor value YR and a value of the yaw rate calculated on the basis of the turn radius r2 (V/r2) is equal to or smaller than a previously determined threshold value TH_7. When this absolute value is equal to or smaller than the threshold value TH_7 (affirmative determination), operation proceeds to step 226, a state Y2 indicating that the yaw rate sensor 26 and the steering angle sensor 28 are normal is stored to the memory, not illustrated, and then operation proceeds to step 228.

Meanwhile, at step 222, if it is determined that the absolute value is not equal to or smaller than the threshold value TH_7 (negative determination), operation proceeds to step 224, a state N2 is stored to the memory, not illustrated, and then the operation proceeds to step 228. Here, the threshold value TH_7 has been assigned a value previously calculated by experiment as a value in which when the absolute value of the difference between the yaw rate sensor value YR and the calculated yaw rate value is equal to or smaller than that value, the yaw rate sensor 26 and the steering angle sensor 28 can be regarded as normal, even after taking account of fabrication error.

At step 228, utilizing Equation (29), it is determined whether an absolute value of a difference between a yaw rate sensor value YR and a value of the yaw rate calculated on the basis of the cross G sensor value Gy (=Gy/V) is equal to or smaller than a previously determined threshold value TH_8. If this absolute value is equal to or smaller than the threshold value TH_8 (affirmative determination), operation proceeds to step 232, a state Y3 indicating that the yaw rate sensor 26 and the cross acceleration sensor 29 are normal is stored to the memory, not illustrated, and then, the operation proceeds to step 234.

Meanwhile, at step 228, if it is determined that the absolute value is not equal to or smaller than the threshold value TH_8 (negative determination), operation proceeds to step 230, a state N3 is stored to the memory, not illustrated, and then the operation proceeds to step 234. Here, the threshold value TH_8 has been assigned a value previously calculated by experiment as a value in which when the absolute value is equal to or smaller than that value, the yaw rate sensor 26 and the cross acceleration sensor 29 can be regarded as normal, even after taking account of fabrication error.

By the above-described processing from step 216 through step 232, either one of the state Y1 and the state N1, either one of the state Y2 and the state N2 and either one of the state Y3 and the state N3 are provided as information with regard to states of the sensors that are objects of abnormality detection.

At step 234, abnormality determination of the respective sensors is carried out as shown below on the basis of the information with regard to the states of the respective sensors provided by the above-described processing.

When the state Y1 and the state Y2 and the state Y3 are established, the yaw rate sensor 26, the steering angle sensor 28 and the cross acceleration sensor 29 are all normal.

When the state Y1 and the state N2 and the state N3 are established, the yaw rate sensor 26 is abnormal.

When the state N1 and the state Y2 and the state N3 are established, the cross acceleration sensor 29 is abnormal.

When the state N1 and the state N2 and the state Y3 are established, the steering angle sensor 28 is abnormal.

When the state N1 and the state N2 and the state N3 are established, two or more of the sensors are abnormal.

Further, at step 234, results of the above-described determination is stored to the memory, not illustrated, thereafter, the operation returns to step 200.

The processes of step 206 and step 212 correspond to the prohibiting device of the present invention and the processing from step 216 through step 234 corresponds to the abnormality detecting device of the present invention.

As has been explained in detail, in the case of the apparatus for detecting abnormality of a vehicle sensor according to the second embodiment, when the grip degree of the wheel with respect to the road is low and when the cross gradient of road is large, abnormality detection of the sensors that are objects of abnormality detection is prohibited and, accordingly, erroneous detection of abnormalities of the sensors can be pre-emptively prevented.

Further, in the case of the apparatus for detecting abnormality of a vehicle sensor according to the second embodiment, abnormalities of the cross acceleration sensor, the yaw rate sensor and the steering angle sensor are accurately detected and, accordingly, control can be made highly accurate in the case of applying the apparatus to detecting cross-slipping of a vehicle with the cross acceleration sensor, the yaw rate sensor and the steering angle sensor for a VSC system.

Third Embodiment

According to a third embodiment, explanation will be given of a mode in a case in which, when an abnormal sensor is detected, abnormality of another sensor can be detected without using a sensor value provided by the abnormal sensor. Further, structure of an apparatus for detecting abnormality of a vehicle sensor according to the third embodiment and operations, other than the sensor abnormality detecting circuit 30, are similar to those in the first embodiment and, accordingly, explanation thereof will be omitted here.

Figure 15:
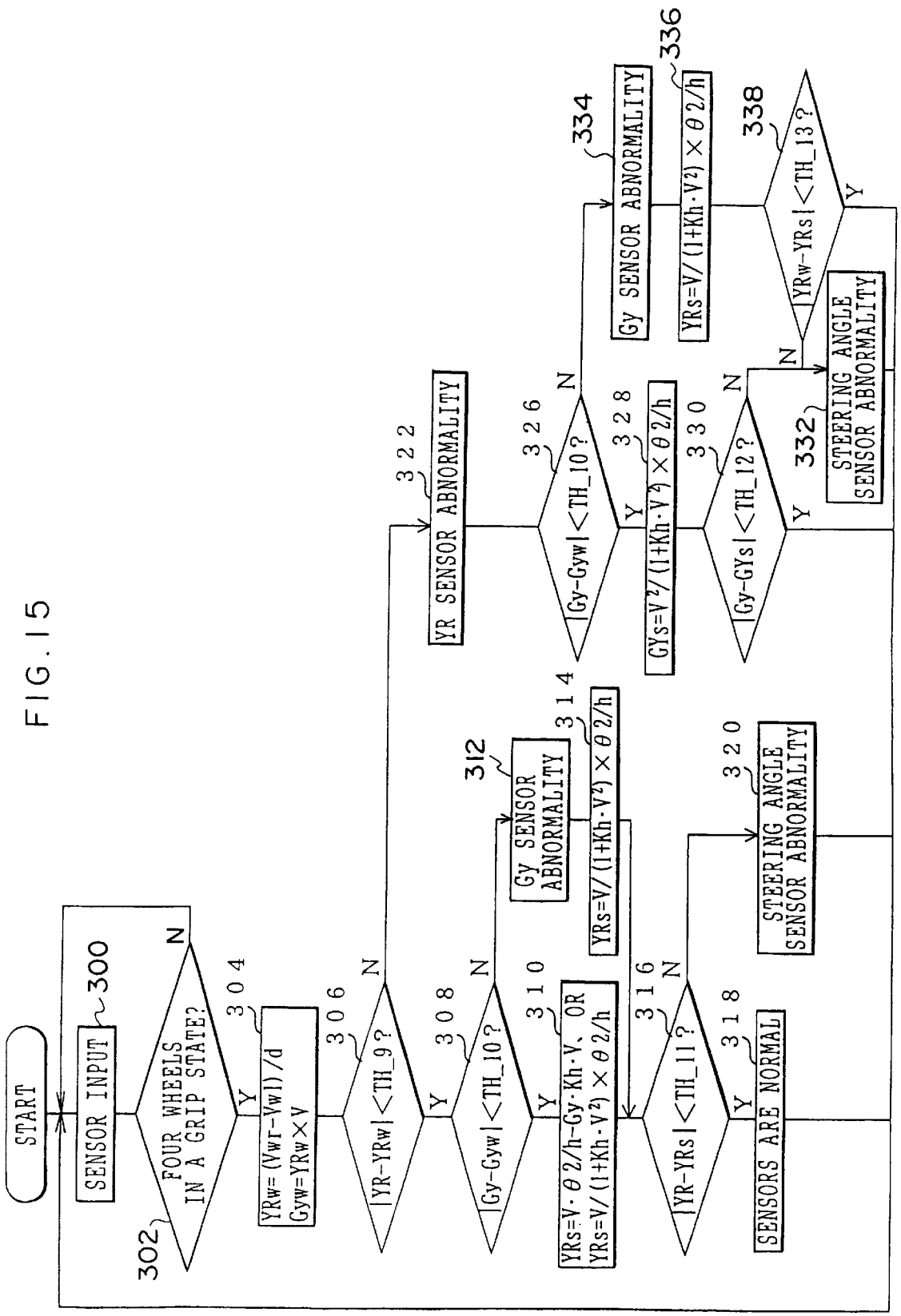
FIG. 15 is a flowchart showing flow of processing of a sensor abnormality detecting circuit according to a third embodiment.

An explanation will be given of specific operation of the sensor abnormality detecting circuit 30 according to the third embodiment with reference to a flowchart shown in FIG. 15 as follows.

First, at step 300, the wheel speed signals outputted from the wheel speed sensors 12, the yaw rate signal indicating the yaw rate and outputted from the yaw rate sensor 26, the steering angle signal indicating the steering angle of the steering wheel and outputted from the steering angle sensor 28, and the cross acceleration signal indicating the cross acceleration and outputted from the cross acceleration sensor 29 are inputted. Thereby, the sensor abnormality detecting circuit 30 can be provided with the wheel speeds, the yaw rate sensor value YR, the steering angle sensor value D, and the cross G sensor value Gy.

At successive step 302, it is determined whether the vehicle is in a state in which four wheels are in the grip state, by comparing the grip level of each of the four wheels inputted from the tire grip state detecting circuit 24 with a previously determined threshold value. Here, the threshold value according to the embodiment has been assigned a value provided previously by experiment as a value of a boundary between the grip state and the slipping state. Further, here, the object of determining whether the grip state is brought about is constituted by all of the four wheels and, accordingly, whether the grip state is established can be determined highly accurately.

If it is determined that all of the four wheels are not in the grip state (negative determination), it is assumed that accuracy of abnormality detection of the sensors constituting the object of abnormality detection by the sensor abnormality detecting circuit 30 (yaw rate sensor 26, steering angle sensor 28, and cross acceleration sensor 29) is low, and operation returns to step 300. If it is determined that all of the four wheels are in the grip state (affirmative determination), the accuracy of abnormality detection of the sensors that are objects of the abnormality detection is assumed to be high, and operation proceeds to step 304. Thereafter, abnormality detection processing of the sensors that are objects of the abnormality detection is carried out.

First, at step 304, a yaw rate value YRw and cross acceleration Gyw are calculated on the basis of the wheel speeds with the following Equation (31) and Equation (32).

$$YRw=(Vwr-Vwl)/d \qquad \text{Equation (31)}$$

$$Gyw=YRw \times V \qquad \text{Equation (32)}$$

where Vwr is wheel speed of right side wheel, Vwl is wheel speed of left side wheel, d is tread, and V is vehicle body speed calculated from wheel speeds.

At successive step 306, it is determined whether an absolute value of a difference between the yaw rate sensor value YR and the value YRw of the yaw rate is equal to or smaller than a previously determined threshold value TH_9. If this absolute value is less than the threshold value TH_9 (affirmative determination), the yaw rate sensor 26 is regarded as normal and operation proceeds to step 308. Here, the threshold value TH_9 has been assigned a value provided previously by experiment as a value in which when the absolute value of the difference between the yaw rate sensor value YR and the calculated yaw rate value YRw is less than that value, the yaw rate sensor 26 can be regarded as normal, even after taking account of fabrication error.

At step 308, it is determined whether an absolute value of a difference between the cross G sensor value Gy and the cross acceleration Gyw is less than a previously determined threshold value TH_10. If this absolute value is less than the threshold value TH_10 (affirmative determination), the cross acceleration sensor 29 is regarded as normal, and operation proceeds to step 310. If the absolute value is not less than the threshold value TH_10 (negative determination), the cross acceleration sensor 29 is regarded as abnormal and operation proceeds to step 312. Here, the threshold value TH_10 has been assigned a value calculated previously by experiment as a value in which when the absolute value between the cross G sensor value Gy and the calculated cross acceleration Gyw is less than that value, the cross acceleration sensor 29 can be regarded as normal, even after taking account of fabrication error.

At step 310, a value YRs of the yaw rate is calculated by the following Equation (33) or Equation (34), and operation proceeds to step 316.

$$YRs=V \cdot \theta 2/h - Gy \cdot Kh \cdot V \qquad \text{Equation (33)}$$

$$YRs=V/(1+Kh \cdot V^2) \times \theta 2/h \qquad \text{Equation (34)}$$

where Kh is a stability factor, θ2 is actual steering angle calculated by dividing a steering angle calculated from the steering angle sensor value D by the gear ratio of steering, and h is wheel base.

Alternatively, at step 312, information indicating that the cross acceleration sensor 29 is abnormal is stored to a memory, not illustrated, provided at the sensor abnormality detecting circuit 30, operation proceeds to step 314, the value YRs of the yaw rate on the basis of the actual steering angle θ2 is calculated by Equation (34), and then operation proceeds to step 316.

That is, when it is determined that the cross acceleration sensor 29 is not abnormal at step 308, Equation (33) using the cross G sensor value Gy is applicable, and when it is determined that the cross acceleration sensor 29 is abnormal, only Equation (34), which does not use the cross G sensor value Gy, is applicable.

At step 316, it is determined whether an absolute value of a difference between the yaw rate sensor value YR and the yaw rate value YRs calculated in step 310 or step 314 is less than a previously determined TH__11. If this absolute value is less than the threshold value TH__11 (affirmative determination), all of the sensors constituting the object of abnormality detection (yaw rate sensor 26, steering angle sensor 28, and cross acceleration sensor 29) are regarded as normal, operation proceeds to step 318, information indicating that all of the sensors that are objects of abnormality detection are normal is stored to the memory, not illustrated, and then operation returns to step 300.

At step 316, if it is determined that the absolute value of the difference between the yaw rate sensor value YR and the calculated yaw rate value YRs is not less than the previously determined threshold value TH__11 (negative determination), the operation proceeds to step 320, information indicating that the steering angle sensor 28 is abnormal is stored to the memory, not illustrated, thereafter, the operation returns to step 300. Here, the threshold value TH__11 has been assigned a value previously calculated by experiment as a value in which when the absolute value of the difference between the yaw rate sensor value YR and the calculated yaw rate value YRs is less than that value, the steering angle sensor 28 can be regarded as normal, even after taking account of fabrication error.

Alternatively, if, at step 306, the absolute value of the difference between the yaw rate sensor value YR and the calculated yaw rate YRw is not less than the previously determined threshold value TH__9 (negative determination), the operation proceeds to step 322, and information indicating that the yaw rate sensor 26 is abnormal is stored to the memory, not illustrated. Then, the operation proceeds to step 326, and it is determined whether an absolute value of a difference between the cross G sensor value Gy and the cross acceleration Gyw is less than the threshold value TH__10. If so (affirmative determination), the operation proceeds to step 328, the cross acceleration GYs on the basis of actual steering angle θ2 is calculated with the following Equation (35), and operation proceeds to step 330.

$$GYs = V^2/(1+Kh \cdot V^2) \times \theta 2/h \qquad \text{Equation (35)}$$

At step 330, it is determined whether an absolute value of a difference between the cross G sensor value GY and the cross acceleration GYs is less than a previously determined threshold value TH__12. If this absolute value is less than the threshold value TH__12 (affirmative determination), the steering angle sensor 28 is regarded as normal, and operation returns to step 300. If the absolute value is not less than the threshold value TH__12 (negative determination), operation proceeds to step 332, information indicating that the steering angle sensor 28 is abnormal is stored to the memory, not illustrated, and then the operation returns to step 300. Here, the threshold value TH__12 has been assigned a value previously provided by experiment as a value in which when the absolute value of the difference between the cross G sensor value Gy and the cross acceleration GYs is less than that value, the steering angle sensor 28 can be regarded as normal, even after taking account of fabrication error.

alternatively, at step 326, if it is determined that the absolute value of the difference between the cross G sensor value Gy and the cross acceleration Gyw is not less than the threshold value TH__10 (negative determination), the operation proceeds to step 334, information indicating that the cross acceleration sensor 29 is abnormal is stored to the memory, not illustrated, and then operation proceeds to step 336 and the value YRs of the yaw rate on the basis of the actual steering angle θ2 is calculated by Equation (34). That is, if step 336 is executed, the yaw rate sensor 26 is abnormal. Therefore, at step 336, the value of the yaw rate is derived without using the yaw rate sensor value YR.

At successive step 338, it is determined whether an absolute value of a difference between the value YRw of the yaw rate and the value YRs of the yaw rate is less than a previously determined threshold value TH__13. If this absolute value is less than the threshold value TH__13 (affirmative determination), the steering angle sensor 28 can be regarded as normal, and operation returns to step 300. If the absolute value is not less than the threshold value TH__13 (negative determination), the operation proceeds to step 332. Here, the threshold value TH__13 has been assigned a value previously provided by experiment as a value in which when the absolute value of the difference between the value YRw of the yaw rate and the value YRs of the yaw rate is less than that value, the steering angle sensor 28 can be regarded as normal, even after taking account of fabrication error.

The processing at step 302 corresponds to the prohibiting device of the present invention and the processing from step 304 through step 338 corresponds to the abnormality detecting device of the present invention.

As has been explained in detail, in the case of the apparatus for detecting abnormality of a vehicle sensor according to the third embodiment, when the grip degree of the wheel with respect to the road is low, abnormality detection of the sensors that are objects of abnormality detection is prohibited and, accordingly, erroneous detection of abnormalities of the sensors can be pre-emptively.

Further, with the apparatus for detecting abnormality of a vehicle sensor according to the third embodiment, abnormalities of the cross acceleration sensor, the yaw rate sensor and the steering angle sensor are accurately detected and, accordingly, control can be made high accurate in the case of applying the apparatus to detecting cross-slipping of a vehicle with the cross acceleration sensor, the yaw rate sensor and the steering angle sensor for a VSC system.

Further, with the apparatus for detecting abnormality of a vehicle sensor according to the third embodiment, when an abnormal sensor is detected, abnormality of another sensor can be detected without using a sensor value provided by the abnormal sensor and, accordingly, abnormality of the sensors can be detected highly accurately.

Further, although in the above-described respective embodiments the tire grip state (turn limit state) is calculated using the road $\mu$ gradient, the present invention is not limited thereto and the tire grip state may be calculated similarly by using brake torque gradient, which is a gradient of brake torque with respect to slip speed, as an equivalent of the road $\mu$ gradient or drive torque gradient, which is a gradient of drive torque. That is, the tire grip state can be calculated on the basis of any physical amount representing slipperiness of a wheel, such as the road $\mu$ gradient, the brake torque gradient or the drive torque gradient.

As has been explained in detail, in the present invention, detection of abnormalities of sensors constituting an object of abnormality detection is prohibited both in a case in which grip degree of the wheel with respect to the road is lower than a predetermined degree and in a case in which cross gradient of the road is equal to or larger than a predetermined value. Accordingly, an effect of enabling pre-emptively prevention of erroneous detection of abnormalities of sensors is achieved.

$$F(s) = \frac{1}{\sum_{i=0}^{m} c_i s^{m-1}}} \quad \text{Equation (1)}$$

$$\Delta\omega_1 = \frac{b_2}{\sum_{i=0}^{2} c_i s^{2-i}} \Delta T + v_1 a_0 = 1 \quad \text{Equation (2)}$$

$$\sum_{i=0}^{2} a_i s^{2-i} \Delta\omega_1 = b_2 \Delta T_d + \sum_{i=0}^{2} a_i s^{2-i} v \quad \text{Equation (3)}$$

$$s = \frac{2}{T_s} \frac{1-d^{-1}}{1+d^{-1}} \quad \text{Equation}$$

$$\sum_{i=0}^{2} a_i \xi_{vi}(k) = b_2 \xi_{u2}(k) + \sum_{i=0}^{2} a_i \xi_{vi}(k) \quad \text{Equation (4)}$$

$$\xi_{v1}(k) = \left(\frac{T_s}{2}\right)^i (1+d)^i (1-d)^{2-i} F_0(d) \Delta\omega(k) \quad \text{Equation (5)}$$

$$\xi_{v2}(k) = \left(\frac{T_s}{2}\right)^2 (1+d)^2 F_0(d) \Delta T_d(k) \quad \text{Equation (6)}$$

$$\xi_{vi}(k) = \left(\frac{T_s}{2}\right)^i (1+d)^i (1-d)^{2-i} F_0(d) v(k) \quad \text{Equation (7)}$$

$$F_0(d) = \frac{1}{\sum_{i=0}^{2} c_i \left(\frac{T_s}{2}\right)^i (1+d)^i (1-d)^{2-i}} \quad \text{Equation (8)}$$

$$r(k) = b_2 \xi_{v2}(k) + \sum_{i=0}^{2} a_1 \xi vi(k) \quad \text{Equation (11)}$$

$$\hat{\theta}(N) = \left[\sum_{k=1}^{N} \rho^{N-k} \zeta(k) \zeta^T(k)\right]^{-1} \left[\sum_{k=1}^{N} \rho^{N-k} \zeta(k) \zeta_{v0}(k)\right]$$

$$\xi_{v0}(k) = \zeta^T(k)\theta + r(k) \quad \text{Equation (9)}$$

$$\zeta(k) = [-\xi_{v1}(k) - \xi_{v2}(k)]^T \; \theta = [a_1 a_2]^T \quad \text{Equation (10)}$$

$$\hat{\theta}(N) = \hat{\theta}(N-1) + h(N)[\xi_{v0}(N) - \zeta^T(N)\hat{\theta}(N-1)] \quad \text{Equation (12)}$$

$$h(N) = \frac{P(N-1)\zeta(N)}{\rho + \zeta^T(N)P(N-1)\zeta(N)} \quad \text{Equation (13)}$$

$$P(N) = \frac{1}{\rho}\{I - h(N)\zeta^T(N)\}P(N-1) \quad \text{Equation (14)}$$

$$\hat{\theta}(-1)=0, \; P(-1)=\alpha 1, \quad \text{Equation}$$

α: Sufficiently large positive number $$\hat{\theta}(N) = \left[\sum_{k=1}^{N} \rho^{N-k} m(k)\zeta^T(k)\right]^{-1} \left[\sum_{k=1}^{N} \rho^{N-k} m(k)\zeta_{v0}(k)\right] \quad \text{Equation (15)}$$

-continued $$\hat{\theta}(N) = \hat{\theta}(N-1) + h(N)[\xi_{v0}(N) - \zeta^T(N)\hat{\theta}(N-1)] \quad \text{Equation (16)}$$

$$h(N) = \frac{P(N-1)m(N)}{\rho + \zeta^T(N)P(N-1)m(N)} \quad \text{Equation (17)}$$

$$P(N) = \frac{1}{\rho}\{I - h(N)\zeta^T(N)\}P(N-1) \quad \text{Equation (18)}$$

$$\hat{\theta}(N) = \left[\sum_{k=1}^{N} \rho^{N-k} m(k)\zeta^T(k)\right]^{-1} \left[\sum_{k=1}^{N} \rho^{N-k} m(k)\zeta_{v0}(k)\right] \quad \text{Equation (19)}$$

$$m(k) = [-\xi y1(k-L) - \xi y2(k-L)]T \quad \text{Equation (20)}$$

$$\frac{\hat{a}_2}{\hat{a}_1} = \frac{D_0}{J_1 + J_2} \quad \text{Equation (21)}$$

$$G(N) \stackrel{def}{=} \sum_{k=1}^{N} \rho^{N-k} \omega(k)^2, \quad \text{Equation}$$

ρ: Oblivion coefficient = about 0.99

$$G(N) = \rho G(N-1) + \omega(N)^2 \quad \text{Equation}$$

$$YR = V/r \quad \text{Equation (22)}$$

$$Gy = V^2/r \quad \text{Equation (23)}$$

$$YR = \theta 2 \cdot V/h - Gy \cdot Kh \cdot V \quad \text{Equation (24)}$$

$$r = \frac{(Vout + Vin)}{(Vout - Vin)} \frac{d\cos\beta}{2} = \frac{(Vout + Vin)}{(Vout - Vin)} \frac{d}{2} \quad \text{Equation (25)}$$

$$\cos\theta 3 = \frac{YR \cdot V - Gy}{g} \quad \text{Equation (26)}$$

$$Gy = V^2/r2 \quad \text{Equation (27)}$$

$$YR = V/r2 \quad \text{Equation (28)}$$

$$YR = Gy/V \quad \text{Equation (29)}$$

$$r2 = (1 + Kh \cdot V^2) \cdot h/\theta 2 \quad \text{Equation (30)}$$

$$YRw = (Vwr - Vw1)/d \quad \text{Equation (31)}$$

$$Gyw = YRw \times V \quad \text{Equation (32)}$$

$$YRs = V \cdot \theta 2/h - Gy \cdot Kh \cdot V \quad \text{Equation (33)}$$

$$YRs = V/(1 + Kh \cdot V^2) \times \theta 2/h \quad \text{Equation (34)}$$

$$GYs = V^2/(1 + Kh \cdot V^2) \times \theta 2/h \quad \text{Equation (35)}$$

What is claimed is:

1. An apparatus for detecting abnormality of a vehicle sensor comprising:

a first sensor for detecting an operational state of a vehicle;

a second sensor, which is different from the first sensor, for detecting the operational state of the vehicle;

an abnormality detecting device for detecting for presence of an abnormality of the first sensor on the basis of a predefined operational state of the vehicle detected by the first sensor and the predefined operational state of the vehicle estimated on the basis of an output of the second sensor;

a grip degree detecting device for detecting grip degree of a wheel of the vehicle with respect to a road surface; and a prohibiting device for prohibiting detection for presence of an abnormality of the first sensor by the abnormality detecting device in at least one case of a case in which the grip degree is lower than a predetermined degree and a case in which a cross-gradient of the road surface is equal to or more than a predetermined value.

2. The apparatus for detecting abnormality of a vehicle sensor according to claim 1, wherein the first sensor is at least one of a cross-acceleration sensor, a yaw rate sensor and a steering angle sensor.

3. The apparatus for detecting abnormality of a vehicle sensor according to claim 1, wherein the second sensor is a wheel speed sensor.

4. The apparatus for detecting abnormality of a vehicle sensor according to claim 2, wherein the second sensor is a wheel speed sensor.

5. The apparatus for detecting abnormality of a vehicle sensor according to claim 1, wherein:

a yaw rate sensor and a cross-acceleration sensor serve as the first sensor, and the abnormality detecting device detects for presence of an abnormality of the yaw rate sensor on the basis of a yaw rate detected by the yaw rate sensor and a yaw rate estimated on the basis of the output of the second sensor;

in a case where an abnormality of the yaw rate sensor is not detected, the cross-acceleration sensor serves as the first sensor, the yaw rate sensor serves as the second sensor, and the abnormality detecting device detects for presence of an abnormality of the cross-acceleration sensor on the basis of a cross-acceleration detected by the cross-acceleration sensor and a cross-acceleration estimated on the basis of an output of the yaw rate sensor; and in a case where an abnormality of the yaw rate sensor is detected, the cross-acceleration sensor serves as the first sensor, a sensor other than the yaw rate sensor serves as the second sensor, and the abnormality detecting device detects for presence of an abnormality of the cross-acceleration sensor on the basis of the cross-acceleration detected by the cross-acceleration sensor and a cross-acceleration estimated on the basis of an output of the sensor other than the yaw rate sensor.

6. The apparatus for detecting abnormality of a vehicle sensor according to claim 1, wherein:

a yaw rate sensor and a cross-acceleration sensor serve as the first sensor, a wheel speed sensor serves as the second sensor, the abnormality detecting device detects for presence of an abnormality of the yaw rate sensor on the basis of a yaw rate detected by the yaw rate sensor and a yaw rate estimated on the basis of an output of the wheel speed sensor;

the abnormality detecting device detects for presence of an abnormality of the cross-acceleration sensor on the basis of a cross-acceleration detected by the cross-acceleration sensor and a cross-acceleration estimated on the basis of the output of the wheel speed sensor.

7. The apparatus for detecting abnormality of a vehicle sensor according to claim 6, wherein:

in a case where the abnormality detecting device detects presence of an abnormality of the cross-acceleration sensor on the basis of the cross-acceleration detected by the cross-acceleration sensor and the cross-acceleration estimated on the basis of the output of the wheel speed sensor, on the basis of the cross-acceleration detected by the cross-acceleration sensor and a cross-acceleration estimated on the basis of an output of a predetermined measuring device, which of:

an abnormality of the cross-acceleration sensor itself, or a cause other than the abnormality of the cross-acceleration sensor itself, is a cause of detection of the abnormality of the cross-acceleration sensor, is determined.

8. The apparatus for detecting abnormality of vehicle sensor according to claim 7, wherein the predetermined measuring device is a slip angle measuring device for measuring a vehicle body slip angle, and the abnormality detecting device determines, on the basis of the cross-acceleration detected by the cross-acceleration sensor and a cross-acceleration estimated on the basis of an output of the slip angle measuring device, whether the detection of the abnormality of the cross-acceleration sensor is due to the abnormality of the cross-acceleration sensor itself, or the detection of the abnormality of the cross-acceleration sensor is rather than due to the abnormality of the cross-acceleration sensor itself, due to the cross-gradient being larger than a predetermined value.

9. The apparatus for detecting abnormality of vehicle sensor according to claim 6, wherein the grip degree detecting device judges whether or not that three or more wheels of the vehicle, including an unsteered wheel, are in grip state with respect to the road surface.

10. The apparatus for detecting abnormality of vehicle sensor according to claim 1, further comprising:

a cross-gradient detecting device for detecting the cross-gradient of the road surface, wherein before the abnormality detecting device detecting for presence of an abnormality of the first sensor, the grip degree and the cross-gradient of the road surface is detected.

11. The apparatus for detecting abnormality of vehicle sensor according to claim 10, wherein the grip degree detecting device judges whether or not that at least two wheels of the vehicle at diagonally opposed positions are in a grip state with respect to the road surface.

12. A method for detecting abnormality of a vehicle sensor comprising:

detecting an operational state of a vehicle by a first sensor;

detecting the operational state of the vehicle by a second sensor, which is different from the first sensor;

detecting presence of an abnormality of the first sensor on the basis of a predefined operational state of the vehicle detected by the first sensor and the predefined operational state of the vehicle estimated on the basis of an output of the second sensor;

detecting grip degree of a wheel of the vehicle with respect to a road surface; and prohibiting detection for presence of an abnormality of the first sensor in at least one case of a case in which the grip degree is lower than a predetermined degree and a case in which a cross-gradient of the road surface is equal to or more than a predetermined value.

13. A method for detecting abnormality of a vehicle sensor according to claim 12, wherein the first sensor is at least one of a cross-acceleration sensor, a yaw rate sensor and a steering angle sensor.

14. A method for detecting abnormality of a vehicle sensor according to claim 12, wherein the second sensor is a wheel speed sensor.

15. A method for detecting abnormality of a vehicle sensor according to claim 12, wherein a yaw rate sensor and a cross-acceleration sensor serve as the first sensor, the method further comprising:

detecting presence of an abnormality of the yaw rate sensor on the basis of a yaw rate detected by the yaw rate sensor and a yaw rate estimated on the basis of the output of the second sensor;

in a case where an abnormality of the yaw rate sensor is not detected, the cross-acceleration sensor serves as the first sensor, the yaw rate sensor serves as the second sensor, detecting presence of an abnormality of the cross-acceleration sensor on the basis of a cross-acceleration detected by the cross-acceleration sensor and a cross-acceleration estimated on the basis of an output of the yaw rate sensor; or, in a case where an abnormality of the yaw rate sensor is detected, the cross-acceleration sensor serves as the first sensor, a sensor other than the yaw rate sensor serves as the second sensor, detecting presence of an abnormality of the cross-acceleration sensor on the basis of the cross-acceleration detected by the cross-acceleration sensor and a cross-acceleration estimated on the basis of an output of the sensor other than the yaw rate sensor.

16. A method for detecting abnormality of a vehicle sensor according to claim 12, wherein a yaw rate sensor and a cross-acceleration sensor serve as the first sensor, a wheel speed sensor serves as the second sensor, the method further comprising:

detecting presence of an abnormality of the yaw rate sensor on the basis of a yaw rate detected by the yaw rate sensor and a yaw rate estimated on the basis of an output of the wheel speed sensor; and detecting presence of an abnormality of the cross-acceleration sensor on the basis of a cross-acceleration detected by the cross-acceleration sensor and a cross-acceleration estimated on the basis of the output of the wheel speed sensor.

17. A method for detecting abnormality of a vehicle sensor according to claim 12, wherein before detecting for presence of an abnormality of the first sensor, the grip degree and the cross-gradient of the road surface is detected.

18. An apparatus for detecting abnormality of a vehicle sensor comprising:

a first sensor for detecting an operational state of a vehicle;

a second sensor, which is different from the first sensor, for detecting the operational state of the vehicle;

an abnormality detecting device for detecting for presence of an abnormality of the first sensor on the basis of a predefined operational state of the vehicle detected by the first sensor and the predefined operational state of the vehicle estimated on the basis of an output of the second sensor;

a grip degree detecting device for detecting grip degree of a wheel of the vehicle with respect to a road surface; and a prohibiting device for prohibiting detection for presence of an abnormality of the first sensor by the abnormality detecting device in at least one case of a case in which the grip degree is lower than a predetermined degree and a case in which a cross-gradient of the road surface is equal to or more than a predetermined value, wherein the first sensor is at least one of a cross-acceleration sensor, a yaw rate sensor and a steering angle sensor, and the second sensor is a wheel speed sensor.

* * * * *